US012782001B2

(12) United States Patent

Miyairi et al.

(10) Patent No.: US 12,782,001 B2
(45) Date of Patent: Nov. 3, 2026

(54) HEATER ELEMENT FOR VEHICLE COMPARTMENT HEATING AND METHOD FOR USING SAME, AND HEATER FOR VEHICLE COMPARTMENT HEATING

(71) Applicant: NGK INSULATORS, LTD., Nagoya (JP)

(72) Inventors: Yukio Miyairi, Nagoya (JP); Masaaki Masuda, Nagoya (JP); Yoshifumi Takagi, Chiryu (JP); Yunie Izumi, Nisshin (JP); Toru Hayase, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1596 days.

(21) Appl. No.: 17/078,550

(22) Filed: Oct. 23, 2020

(65) Prior Publication Data

US 2021/0041141 A1 Feb. 11, 2021

Related U.S. Application Data

(63) Continuation of application No. PCT/JP2019/030094, filed on Jul. 31, 2019.

(30) Foreign Application Priority Data

Aug. 13, 2018 (JP) ................................ 2018-152534
Aug. 23, 2018 (JP) ................................ 2018-156619

(51) Int. Cl.
*F24H 3/04* (2022.01)
*B60H 1/22* (2006.01)
*H05B 3/03* (2006.01)

(52) U.S. Cl.
CPC ......... *F24H 3/0435* (2013.01); *B60H 1/2225* (2013.01); *H05B 3/03* (2013.01);
(Continued)

(58) Field of Classification Search
CPC ....................................... H05B 2203/022–024
(Continued)

(56) References Cited

U.S. PATENT DOCUMENTS 3,927,300 A 12/1975 Wada et al.
4,032,752 A * 6/1977 Ohmura ................ F01N 3/2013 252/514

(Continued)

FOREIGN PATENT DOCUMENTS

CN 114763308 A * 7/2022 ........... B60H 1/2215
DE 10060301 A1 * 1/2003 ........... B60H 1/2225

(Continued)

OTHER PUBLICATIONS

JP2008056044 (A), Adachi et al., partial translation, Mar. 2008 (Year: 2008).*

(Continued)

*Primary Examiner* — John J Norton
*Assistant Examiner* — Thomas J Ward
(74) *Attorney, Agent, or Firm* — Muncy, Geissler, Olds & Lowe, P.C.

(57) ABSTRACT

A heater element for vehicle compartment heating in a vehicle, including a pillar-shaped honeycomb structure portion having:

an outer peripheral side wall; and partition walls disposed inside the outer peripheral side wall, the partition walls defining a plurality of cells which form flow paths from a first end face to a second end face;

wherein the partition walls have PTC characteristics;

an average thickness of the partition walls is 0.13 mm or less; and (Continued)

an open frontal area on the first and second end faces is 0.81 or more.

13 Claims, 16 Drawing Sheets

(52) U.S. Cl.
CPC ...... *F24H 2250/02* (2013.01); *F24H 2250/04* (2013.01); *H05B 2203/016* (2013.01); *H05B 2203/02* (2013.01); *H05B 2203/022* (2013.01); *H05B 2203/023* (2013.01); *H05B 2203/024* (2013.01)

(58) Field of Classification Search
USPC ........................................................ 219/505
See application file for complete search history.

(56) References Cited

U.S. PATENT DOCUMENTS

| | | | | |
|---|---|---|---|---|
| 4,483,933 | A * | 11/1984 | Kobayashi | C04B 35/4684 252/519.12 |
| 4,654,510 | A | 3/1987 | Umeya et al. | |
| 2008/0217315 | A1 | 9/2008 | Bruck | |
| 2012/0241439 | A1* | 9/2012 | Hashimoto | F01M 5/00 219/541 |
| 2014/0008450 | A1 | 1/2014 | Gu et al. | |
| 2014/0296054 | A1 | 10/2014 | Kikuchi et al. | |
| 2016/0243500 | A1* | 8/2016 | Omiya | F01N 3/0222 |
| 2017/0260887 | A1* | 9/2017 | Takase | B01J 35/023 |
| 2017/0321585 | A1* | 11/2017 | Takase | F01N 3/2842 |
| 2018/0222287 | A1 | 8/2018 | Mieda et al. | |
| 2020/0291841 | A1* | 9/2020 | Takase | C04B 35/6365 |
| 2022/0227672 | A1* | 7/2022 | Hayase | C04B 35/4682 |
| 2022/0240352 | A1* | 7/2022 | Morita | H05B 3/141 |
| 2022/0266659 | A1* | 8/2022 | Bitto-Golon | B60H 1/2225 |
| 2022/0287154 | A1* | 9/2022 | Morita | B01J 35/04 |
| 2022/0371405 | A1* | 11/2022 | Miyairi | B60H 1/2225 |
| 2022/0412243 | A1* | 12/2022 | Takahashi | H05B 3/141 |
| 2023/0129722 | A1* | 4/2023 | Miyairi | H05B 3/14 237/12.3 R |

FOREIGN PATENT DOCUMENTS

| | | | | |
|---|---|---|---|---|
| DE | 10201262 | A1 * | 8/2003 | B60H 1/2225 |
| DE | 102007001451 | A1 * | 7/2008 | B60H 1/2225 |
| DE | 10 2010 037 128 | A1 | 3/2012 | |
| JP | S49-114130 | A1 | 10/1974 | |
| JP | S51-027460 | U | 2/1976 | |
| JP | S54-110151 | U | 8/1979 | |
| JP | S54-123442 | U | 8/1979 | |
| JP | S57-101496 | U | 6/1982 | |
| JP | S58-002885 | U | 1/1983 | |
| JP | S63-130421 | A | 6/1988 | |
| JP | 2008056044 | A * | 3/2005 | |
| JP | 2006-035939 | A | 2/2006 | |
| JP | 2008-215351 | A1 | 9/2008 | |
| JP | 2009-145027 | A | 7/2009 | |
| JP | 5261256 | B2 | 8/2013 | |
| JP | 2014-054934 | A | 3/2014 | |
| JP | 2014054935 | A * | 3/2014 | F01N 3/2013 |
| JP | 2015-519260 | A1 | 7/2015 | |
| JP | 2017-030724 | A1 | 2/2017 | |
| JP | 2022069489 | A * | 5/2022 | B60H 1/2225 |
| KR | 102246518 | B1 * | 4/2021 | B60H 1/22 |

OTHER PUBLICATIONS

Machine Translation of JP2014054935A (Year: 2025).*

Extended European Search Report (Application No. 19850583.6) dated Jan. 18, 2022.

Japanese Office Action (Application No. 2020-537408) dated Sep. 20, 2022 (with English translation).

International Search Report and Written Opinion (Application No. PCT/JP2019/030094) dated Sep. 10, 2019.

Chinese Office Action (with English translation) dated Jul. 21, 2022 (Application No. 201980027928.X).

English translation of the International Preliminary Report on Patentability (Chapter I)(Application No. PCT/JP2019/030094) dated Feb. 16, 2021.

Japanese Office Action (Application No. 2022-065371) dated Jun. 20, 2023 (with English translation) (9 pages).

* cited by examiner

Side view

Cross section of heat generating portion

Temperature distribution of partition walls in Example 7

Temperature distribution of partition walls in Comparative Example 5

HEATER ELEMENT FOR VEHICLE COMPARTMENT HEATING AND METHOD FOR USING SAME, AND HEATER FOR VEHICLE COMPARTMENT HEATING

FIELD OF THE INVENTION

The present invention relates to a heater element for vehicle compartment heating, and a method for using the same. Further, the present invention relates to a heater for vehicle compartment heating.

BACKGROUND OF THE INVENTION

From the viewpoint of protecting the global environment, demands for reducing $CO_2$ emissions from automobiles are increasing. In addition, from the viewpoint of achieving environmental standards in urban areas, demand for zero emission of nitrogen oxides from automobiles is increasing. As a measure that can address these issues, electric vehicles have been drawing attention. However, since an electric vehicle does not have an internal combustion engine that has conventionally been used as a heat source for heating, there is a problem that the heat source for heating is insufficient.

Therefore, a vapor compression heat pump has been used to perform heating by effectively using battery power (Patent Literature 1). In a vapor compression heat pump, a medium is compressed by an electric compressor, and by utilizing heat absorption and heat dissipation due to a phase change between a gas phase and a liquid phase, heat is pumped from the cold outside air into the vehicle compartment. Since the amount of heat that can be pumped is large with respect to the input power, there is an advantage that the electric energy can be used more effectively.

Further, a heater using the Joule heat generated by electric resistance during energization is also known (Patent Literature 2). In a heater using Joule heat, a heating element is arranged in a heat exchanger, and a fluid passing through the heat exchanger is heated. A heater that uses Joule heat is effective when rapid heating is required at the time of starting the vehicle or when the outside air temperature is very low. It is known to use a PTC material as the heating element in order to prevent thermal runaway.

On the other hand, a heater using a honeycomb heater element (hereinafter referred to as "honeycomb heater") is known. For example, Patent Literature 3 discloses that a honeycomb-shaped heating element using a barium titanate-based PTC thermistor is used in fields such as a hot air heater, a dryer, and a hair dryer. In addition, Patent Literature 4 discloses a honeycomb structure for energization which is effective for heating exhaust gas from a gasoline engine, a diesel engine, and a combustion device. Further, Patent Literature 5 also discloses an electrically heatable honeycomb body for treating exhaust gas from an internal combustion engine. Patent Literature 5 discloses that at least one control element made of PTC material is at least thermally brought into contact with a fluid flowing through the honeycomb body.

CITATION LIST

Patent Literature

[Patent Literature 1] Japanese Patent Application Publication No. 2017-30724A

[Patent Literature 2] Japanese Patent Application Publication No. 2015-519260A

[Patent Literature 3] Japanese Utility Model Application Publication No. S54-123442U

[Patent Literature 4] Japanese Patent No. 5261256B

[Patent Literature 5] Japanese Patent Application Publication No. 2008-215351A

SUMMARY OF THE INVENTION

Although a heat pump is excellent from the viewpoint of thermal efficiency, there are problems that a heat pump is difficult to operate when the outside air is extremely cold, and that it is difficult to rapidly warm the vehicle compartment at the time the vehicle is started. Therefore, when using a heat pump as the main heating, it is considered practical to use a heater that uses Joule heat as an auxiliary when rapid heating at vehicle start is required or when the outside temperature is extremely low.

However, a conventional heater using Joule heat is apt to be large in size, and there is a problem that the space inside the vehicle is reduced. Therefore, it is desirable to provide a more compact heater. In this respect, since a honeycomb heater can increase the heat transfer area with respect to volume, it is considered to contribute to downsizing of the heater. However, the honeycomb structure for energization disclosed in Patent Literature 4 may be excessively heated due to the honeycomb structure having the NTC characteristics, so that is difficult to apply as a heater for heating a vehicle compartment. Further, in the technique disclosed in Patent Literature 5, the temperature of the control element made of the PTC material does not follow the temperature of the honeycomb body, so that it cannot be said that the effect of suppressing excessive heat generation is sufficient as a heater for heating a vehicle compartment. On the other hand, the honeycomb-shaped heating element using the PTC thermistor disclosed in Patent Literature 3 can suppress excessive heat generation, but it cannot satisfy a sufficient heating area and electric resistance characteristics. Especially, there was a problem that the initial electric resistance was so low that the initial current became excessive. When the current value becomes high, it becomes necessary to design peripheral devices corresponding to the increase in the current value, resulting in high cost. From the above, there has been no honeycomb heater yet that solves the above-mentioned problems in the application of heating the vehicle compartment of a vehicle such as an automobile or an electric train.

The present invention has been made in view of the above circumstances, and it is an object of the present invention to provide a heater element for vehicle compartment heating that uses a PTC material and satisfies a sufficient heat transfer area and electric resistance characteristics. In another embodiment of the present invention aims to provide a method of using such a heater element for vehicle compartment heating. In yet another embodiment of the present invention, it is an object of the present invention to provide a heater for vehicle compartment heating comprising such a heater element for vehicle compartment heating.

The present inventors have conducted extensive studies to solve the above problems, and have noticed that it would be enough to heat the vehicle compartment to a room temperature at which a person is comfortable, and excessive heating is not necessary, considering that a honeycomb heater is used for heating a vehicle compartment. From this viewpoint, the present inventors have studied requirements effective for satisfying the sufficient heat transfer area and electric resistance characteristics as a heater element for heating vehicle compartment, and have completed the invention exemplified as below.

[1]

A heater element for vehicle compartment heating in a vehicle, comprising a pillar-shaped honeycomb structure portion having:

an outer peripheral side wall; and partition walls disposed inside the outer peripheral side wall, the partition walls defining a plurality of cells which form flow paths from a first end face to a second end face;

wherein the partition walls have PTC characteristics;

an average thickness of the partition walls is 0.13 mm or less; and an open frontal area on the first and second end faces is 0.81 or more.

[2]

The heater element for vehicle compartment heating according to [1], wherein the outer peripheral side wall and the partition walls have PTC characteristics.

[3]

The heater element for vehicle compartment heating according to [1] or [2], wherein the average thickness of the partition walls is 0.08 mm or less, and a cell density is 60 cells/cm$^2$ or more.

[4]

The heater element for vehicle compartment heating according to any one of [1] to [3], wherein in the pillar-shaped honeycomb structure portion, the first and second end faces each has an area of 50 cm$^2$ or more, and a flow path length of the cells is 40 mm or less.

[5]

The heater element for vehicle compartment heating according to any one of [1] to [4], wherein the pillar-shaped honeycomb structure portion has a cylindrical shape or a polygonal pillar shape.

[6]

The heater element for vehicle compartment heating according to any one of [1] to [5], wherein the outer peripheral side wall and the partition walls are made of a material having a Curie point of 100° C. or more and 250° C. or less.

[7]

The heater element for vehicle compartment heating according to any one of [1] to [6], wherein the outer peripheral side wall and the partition walls are made of a material comprising barium titanate as a main component.

[8]

The heater element for vehicle compartment heating according to any one of [1] to [7], wherein an apparent heat transfer coefficient h (unit: W/(m$^2$·K))×a total surface area (unit: m$^2$) S is 20 to 80 W/K.

(The apparent heat transfer coefficient h is calculated by the following equation (1):

$$h=(Nu/d)\times\lambda \quad (1)$$

wherein Nu is a fixed value of 3.63, d is a hydraulic diameter (m) of the cells, λ is a thermal conductivity of air (W/(m·K)), and assuming $\lambda=2.5\times10^{-2}$;

the total surface area S is calculated by the following equation (2):

$$S=GSA\times V \quad (2)$$

wherein V represents a volume (m$^3$) of the pillar-shaped honeycomb structure portion, GSA represents a surface area per volume of the pillar-shaped honeycomb structure portion (m$^2$/m$^3$), and GSA is calculated by the following equation (3):

$$GSA=\{4(P-t)\times Li\}/\{Li\times P^2\} \quad (3)$$

wherein Li represents a unit length (1 m), P represents an average cell pitch (m), and t represents the average thickness (m) of the partition walls.)

[9]

A heater element for vehicle compartment heating, wherein two or more heater elements for vehicle compartment heating according to any one of [1] to [8] are bonded together at their outer peripheral side walls.

[10]

The heater element for vehicle compartment heating according to any one of [1] to [9], wherein the pillar-shaped honeycomb structure portion comprises a pair of electrodes.

[11]

The heater element for vehicle compartment heating according to [10], wherein the electrodes are respectively bonded to both end faces of the pillar-shaped honeycomb structure portion.

[12]

The heater element for vehicle compartment heating according to [11], wherein each of the electrodes is provided so as to cover each of the first and second end faces without blocking the cells.

[13]

A method for using the heater element for vehicle compartment heating according to any one of claims 10 to 12, wherein a voltage of 200 V or more is applied between the electrodes.

[14]

The method for using a heater element for vehicle compartment heating according to [13], wherein a temperature of a gas flowing into the cells is −60° C. to 20° C.

[15]

A heater for vehicle compartment heating, comprising:

the heater element for vehicle compartment heating according to any one of [1] to [12], an inflow piping communicating an outside air or an air inside the vehicle compartment with the first end face of the heater element for vehicle compartment heating, a battery for applying voltage to the heater element for vehicle compartment heating; and an outflow piping communicating the second end face of the heater element for vehicle compartment heating with the air inside the vehicle compartment.

According to one embodiment of the honeycomb-shaped heater element of the present invention, the open frontal area is large, and the average thickness of the partition walls is thin. With this configuration, the current passage in the honeycomb can be reduced, so that the electric resistance can be increased, and a heater element for heating the vehicle compartment that suppresses the initial current can be provided.

BRIEF DESCRIPTION OF THE DRAWINGS

FIG. 11 (B) is a cross-section view of the heater element models used in Comparative Example 4 and Example 6 as viewed from a direction parallel to the fluid flow.

FIG. 13 (B) is a graph showing the relationship between the average outlet temperature of the fluid and the pressure loss from the inlet to the outlet for the heater elements according to Comparative Example 4 and Example 6.

FIG. 15 (B) is a graph showing the relationship between electricity consumption and time for the heater elements according to Example 7 and Comparative Example 5.

FIG. 16 (B) shows the temperature distribution of the partition walls from the inlet to the outlet regarding the heater element according to Comparative Example 5.

DETAILED DESCRIPTION OF THE INVENTION

Hereinafter, embodiments of the present invention will now be described in detail with reference to the drawings. It should be understood that the present invention is not intended to be limited to the following embodiments, and any modification, improvement or the like of the design may be appropriately added based on ordinary knowledge of those skilled in the art without departing from the spirit of the present invention.

(1. Heater Element)

The heater element according to the present invention can be suitably used as a heater element for vehicle compartment heating in a vehicle. Vehicles include, but are not limited to, automobiles and electric trains. Automobiles include, but are not limited to, gasoline vehicles, diesel vehicles, fuel cell vehicles, electric vehicles and plug-in hybrid vehicles. The heater element according to the present invention can be suitably used especially for vehicles having no internal combustion engine such as electric vehicles and electric trains.

Figure 1:
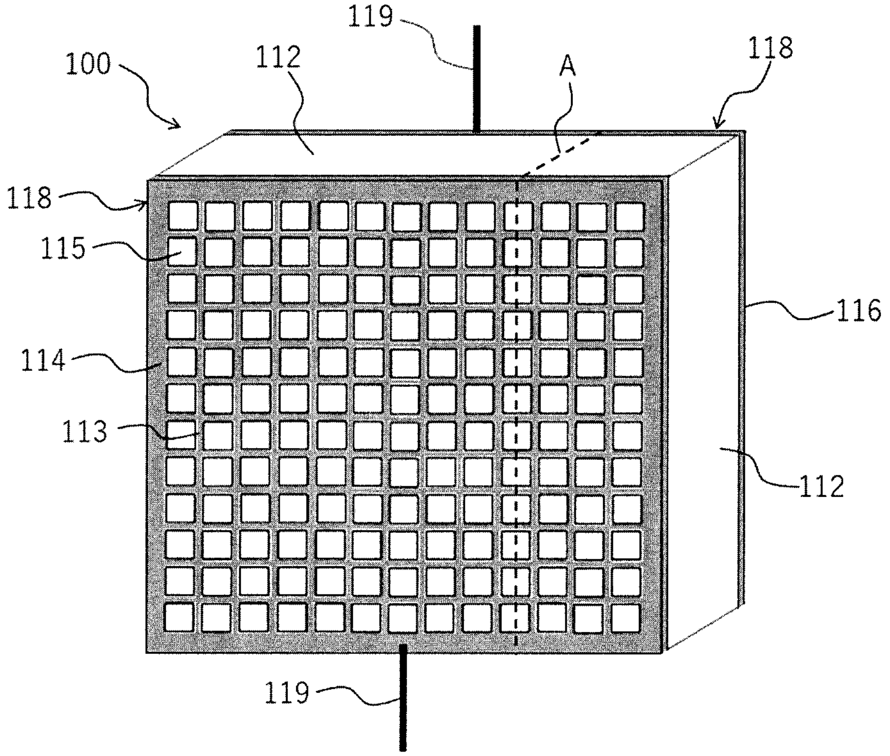
FIG. 1 is a schematic perspective view regarding a first embodiment of the heater element according to the present invention.
Figure 2:
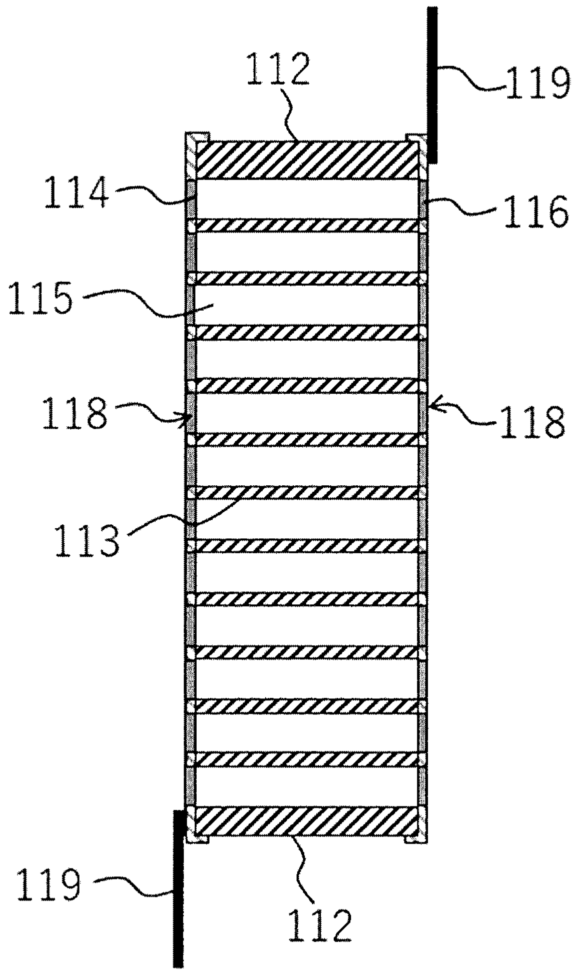
FIG. 2 is a schematic cross-section view regarding a first embodiment of the heater element according to the present invention.

FIG. 1 shows a schematic perspective view regarding a first embodiment of the heater element according to the present invention. FIG. 2 shows a schematic cross-section view regarding a first embodiment of the heater element according to the present invention. The heater element 100 of this embodiment comprises a pillar-shaped honeycomb structure portion having an outer peripheral side wall 112 and partition walls 113 disposed inside the outer peripheral side wall 112, the partition walls defining a plurality of cells 115 which form flow paths from a first end face 114 to a second end face 116.

The pillar-shaped honeycomb structure portion can have any shape, for example, pillar shape with polygonal end faces (quadrangle (rectangle, square), pentagon, hexagon, heptagon, octagon, and the like), pillar shape with circular end faces (cylindrical), pillar shape with oval-shaped end faces, pillar shape with L-shaped end faces, and the like. When the end face is polygonal, the corners may be chamfered. The pillar-shaped honeycomb structure portion in the heater element shown in FIGS. 3 and 4 described later have chamfered rectangular end faces.

The shape of the cell in the cross-section orthogonal to the flow path of the cells is not limited, but is preferably quadrangular (rectangular, square), hexagonal, octagonal, or a combination of two or more thereof. Among these, square and hexagon are preferable. With such a cell shape, it is possible to reduce the pressure loss when gas is flown through a honeycomb formed body. In the pillar-shaped honeycomb structure portion of the heater element according to the embodiment shown in FIG. 1, the shape of the cell in the cross-section orthogonal to the flow path of the cells is a square.

From the viewpoint of ensuring gas flow rate, the lower limit of the area of each end face of the pillar-shaped honeycomb structure portion is preferably 50 $cm^2$ or more, more preferably 70 $cm^2$ or more, and even more preferably 100 $cm^2$ or more. From the viewpoint of making the heater element compact, the upper limit of the area of each end face of the pillar-shaped honeycomb structure portion is preferably 300 $cm^2$ or less, more preferably 200 $cm^2$ or less, and even more preferably 150 $cm^2$ or less. The area of each end face of the pillar-shaped honeycomb structure portion can be set to, for example, 50 to 300 $cm^2$.

From the viewpoint of making the heater element compact, the upper limit of the height (the flow path length of each cell) of the pillar-shaped honeycomb structure portion is, for example, preferably 40 mm or less, more preferably 30 mm or less, more preferably 20 mm or less, and even more preferably 10 mm or less. From the viewpoint of ensuring heating performance and strength, it is preferable that the lower limit of the height (the flow path length of each cell) of the pillar-shaped honeycomb structure portion is 3 mm or more. The height (the flow path length of each cell) of the pillar-shaped honeycomb structure portion can be set to, for example, 3 to 40 mm.

A conventional PTC heater for vehicle-mounted heating has a structure in which a PTC element is covered with a cover made of aluminum metal or the like with an insulating material therebetween, and heat is transmitted to an aluminum fin structure that is in contact with the cover to heat air through the aluminum fin. Therefore, the PTC element does not come into direct contact with air. On the other hand, the heater element according to the present invention includes a pillar-shaped honeycomb structure portion having PTC characteristics, and the pillar-shaped honeycomb structure portion itself generates heat, and air can be directly heated. That is, heat can be transferred to the air without passing through an insulating material or aluminum metal, so that it is possible to reduce the temperature difference between the pillar-shaped honeycomb structure portion and the air. As a result, in the prior art, it was necessary to raise the temperature of the PTC element material with respect to a target gas temperature, but in the present invention, a target gas temperatures can be achieved by PTC materials with lower temperature. Therefore, it is possible to use a PTC material having a lower Curie temperature compared with the PTC materials used in the prior art.

Further, in the prior art, since a PTC element is used in a sealed state without directly contacting with air, PTC materials containing lead which is a harmful component has been used as a shifter. However, since the PTC material used for the pillar-shaped honeycomb structure portion according to one embodiment of the present invention is in direct contact with air, it is preferable that the pillar-shaped honeycomb structure portion does not contain lead which is a harmful component.

(1-1. Material)

In the heater element 100 according to the embodiment shown in FIG. 1, the partition walls 113 is made of a material capable of generating heat when energized. Therefore, when a gas such as the outside air or the air in the vehicle compartment flows from the first end face 114, passing through a plurality of cells 115, and then flows out from the second end face 116, the gas can be heated by heat transfer from the partition walls which generates heat. Similarly, the outer peripheral side wall 112 can also be made of a material that can generate heat when energized.

Moreover, in the heater element 100 according to the embodiment shown in FIG. 1, the partition walls 113 has PTC (Positive Temperature Coefficient) characteristics. That is, the partition walls 113 has a characteristic that when the temperature rises and exceeds its Curie point, the resistance value sharply rises and it becomes difficult for electricity to flow. With the partition walls 113 having PTC characteristics, the electric current flowing through the heater element 100 when the temperature of the heater element 100 becomes high is limited, so that the heater element 100 can be prevented from generating excessive heat. Preferably, both the outer peripheral side wall 112 and the partition walls 113 have PTC characteristics.

From the viewpoint of being able to generate heat by energization and having PTC characteristics, the outer peripheral side wall 112 and the partition walls 113 are preferably ceramics composed of a material containing barium titanate as a main component, more preferably ceramics composed of a material containing 70% by mass of barium titanate, and even more preferably ceramics composed of a material containing 90% by mass of barium titanate. In order to obtain desired PTC characteristics, it is preferable that the ceramic contains one or more additives such as rare earth elements. As the additives, a semiconducting agent such as Y, La, Ce, Pr, Nd, Sm, Eu, Gd, Tb, Dy, Ho, Er, Tm, Yb and Lu, a low temperature side shifter such as Sr, Sn and Zr, a high temperature side shifter such as (Bi—Na), (Bi—K), a property improver such as Mn, a metal oxides (especially oxides of rare earth elements) such as vanadium oxide and yttrium oxide, and a conductor powder such as carbon black and nickel may be mentioned. As another PTC material, there is a composite material containing a conductive filler having a cristobalite phase $SiO_2$ as a base material. Instead of the cristobalite phase $SiO_2$ base material, tridymite phase $SiO_2$, cristobalite phase $AlPO_4$, or tridymite phase $AlPO_4$ may be used.

The lower limit value of the Curie point of the material forming the outer peripheral side wall and the partition walls is preferably 100° C. or more, more preferably 125° C. or more, and even more preferably 150° C. or more, from the viewpoint of efficiently heating the air for heating. In addition, the upper limit value of the Curie point of the material forming the outer peripheral side wall and the partition wall is preferably 250° C. or less, more preferably 225° C. or less, and even more preferably 200° C. or less, from the viewpoint of safety as a component placed in the vehicle compartment or in the vicinity of the vehicle compartment.

The Curie point of the material forming the outer peripheral side wall and the partition walls can be adjusted by the type and the addition amount of the shifter. For example, the Curie point of barium titanate ($BaTiO_3$) is about 120° C., but it is possible to shift the Curie point to the low temperature side by replacing a part of Ba and Ti with one or more of Sr, Sn and Zr. Further, by replacing a part of Ba with Pb, the Curie temperature can be shifted to the high temperature side.

In the present invention, the Curie point is measured by the following method. Attach the sample to a sample holder for measurement, mount it in a measuring tank (for example, MINI-SUBZERO MC-810P available from Tabai Espec), and measure the change in the electrical resistance of the sample when the temperature is raised from 10° C. with a DC resistance meter (for example, Multimeter 3478A available from YHP). From the electric resistance-temperature plot obtained by the measurement, the temperature at which the resistance value becomes twice the resistance value at room temperature (20° C.) is defined as the Curie point.

(1-2. Partition Wall Thickness)

From the viewpoint of suppressing the initial current, it is advantageous to make the current path smaller and increase the electric resistance. Therefore, the upper limit of the average thickness of the partition walls 113 in the honeycomb structure portion is preferably 0.13 mm or less, more preferably 0.10 mm or less, and even more preferably 0.08 mm or less. However, from the viewpoint of ensuring the strength of the honeycomb structure portion, the lower limit of the average thickness of the partition walls 113 is preferably 0.02 mm or more, more preferably 0.04 mm or more, and even more preferably 0.06 mm or more.

In the present invention, the thickness of a partition wall refers to a length of a line segment crossing the partition wall when the centroids of adjacent cells are connected by the line segment in a cross-section orthogonal to the flow path of the cells. The average thickness of partition walls refers to the average value of the thickness of all the partition walls.

When the thickness of the partition walls is reduced, the strength of the pillar-shaped honeycomb structure portion is likely to decrease. Therefore, it is possible to reinforce the strength by providing partition walls A having a larger partition wall thickness and partition walls B having a smaller partition wall thickness. From the viewpoint of reinforcing the pillar-shaped honeycomb structure portion, it is preferable that at least the partition walls forming the outermost cell group be thicker. For example, while maintaining the above range as the average thickness of the partition walls, a part of the partition walls A (for example, within 60%, preferably 10% to 30% of the total number of partition walls) may have a thickness of 0.12 mm or more, preferably 0.15 mm or more, more preferably 0.18 mm or more, for example, 0.12 to 0.18 mm, and typically 0.15 to 0.18 mm, and the thickness of the remaining partition walls B may have a thickness of 0.10 mm or less, preferably 0.08 mm or less, more preferably 0.06 mm or less, for example, 0.05 to 0.10 mm, and typically 0.05 to 0.08 mm.

Figure 3:
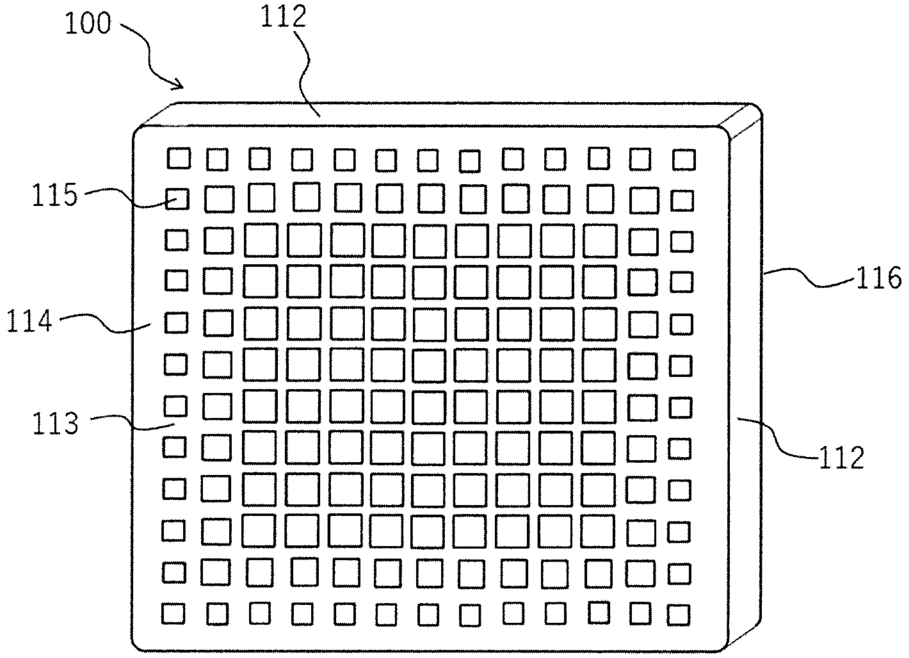
FIG. 3 is a schematic perspective view regarding a second embodiment of the heater element according to the present invention.
Figure 4:
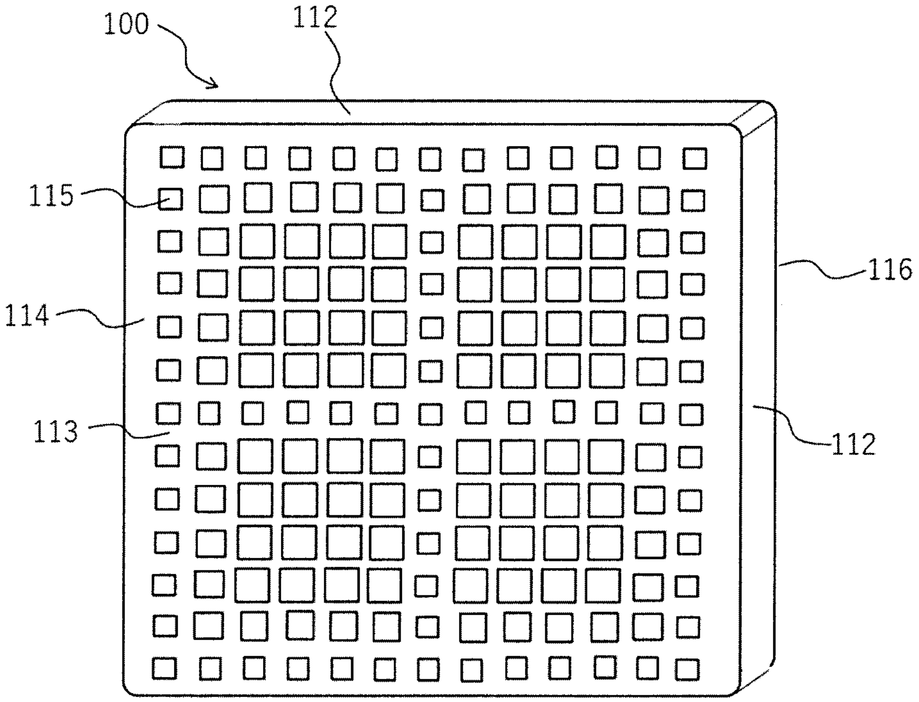
FIG. 4 is a schematic perspective view regarding a third embodiment of the heater element according to the present invention.

FIGS. 3 and 4 show an example of a heater element having a pillar-shaped honeycomb structure portion in which partition walls with larger partition wall thickness are partially provided. In FIGS. 3 and 4, the same reference numerals as those shown in FIG. 1 refer to the same explanations as those in FIG. 1, so the explanation is omitted. In the heater element of the second embodiment shown in FIG. 3, the partition walls that partition and form the outermost cell group, and excluding this outer most cell group, the partition walls that partition and form the next outermost cell group, have larger thickness than the remaining partition walls. In the heater element of the third embodiment shown in FIG. 4, in addition to the partition walls pointed out in the second embodiment, partition walls that partition and form the cell group arranged in a cross shape passing through the center of the end face of the pillar-shaped honeycomb structure portion also have larger thickness than the remaining partition walls.

In addition to the above reinforcing method, or instead of the above reinforcing method, the strength of the pillar-shaped honeycomb structure portion can be reinforced by increasing the thickness of the outer peripheral side wall. From the viewpoint of reinforcing the pillar-shaped honeycomb structure portion, the lower limit of the thickness of the outer peripheral side wall is preferably 0.05 mm or more, more preferably 0.06 mm or more, and even more preferably 0.08 mm or more. However, from the viewpoints of increasing the electric resistance to suppress the initial current, and reducing the pressure loss during gas flow, the upper limit of the thickness of the outer peripheral side wall is preferably 1 mm or less, more preferably 0.5 mm or less, even more preferably 0.4 mm or less, and even more preferably 0.3 mm or less.

In the present invention, the thickness of the outer peripheral side wall refers to the length in the normal direction with respect to the side surface of the pillar-shaped honeycomb structure portion in a cross-section orthogonal to the flow path of the cell, the length being from the boundary between the outer peripheral side wall and the cell or the partition wall on the outermost peripheral side to the side surface.

(1-3. Open Frontal Area)

From the viewpoint of suppressing the initial current, it is advantageous that the open frontal area (OFA) is large. Therefore, the lower limit of the open frontal area on each end face of the honeycomb structure portion is preferably 0.81 or more, more preferably 0.83 or more, and even more preferably 0.85 or more. In addition, by increasing the open frontal area (OFA), the flow resistance can be further suppressed. However, from the viewpoint of ensuring the strength of the honeycomb structure portion, the upper limit of the open frontal area on each end face of the honeycomb structure portion is preferably 0.92 or less, more preferably 0.90 or less, and even more preferably 0.88 or less.

In the present invention, the open frontal area on each end face of the pillar-shaped honeycomb structure portion refers to the ratio of the area of the cell opening portion on each end face to the area of the end face including the cell opening portion.

(1-4. Cell Density)

The pillar-shaped honeycomb structure portion preferably has a cell density of 60 cells/cm$^2$ or more, and more preferably 80 cells/cm$^2$ or more. By limiting the cell density to the above range in combination with the preferred range of the average thickness of the partition walls described above, it is possible to obtain a heater element suitable for rapid heating while suppressing the initial current. From the viewpoint of suppressing flow resistance to suppress output of the blower, the pillar-shaped honeycomb structure portion preferably has a cell density of 150 cells/cm$^2$ or less, and more preferably 120 cells/cm$^2$ or less. In the present invention, the cell density of the pillar-shaped honeycomb structure portion is a value obtained by dividing the number of cells by the area of each end face of the pillar-shaped honeycomb structure portion.

(1-5. Heat Transfer Coefficient to Gas)

The value (h×S) obtained by multiplying the apparent heat transfer coefficient h (unit: W/(m$^2$·K)) by the total surface area (unit: m$^2$) S is an index showing the heat transfer coefficient from the heater element to the gas. In order to enhance the heating performance and downsize the heater element, the lower limit of h×S is preferably 20 W/K or more, more preferably 25 W/K or more, even more preferably 30 W/K or more, and even more preferably 40 W/K or more. In addition, from the viewpoint of avoiding honeycomb destruction due to thermal shock caused by cold air cooling the honeycomb, the upper limit of h×S is preferably 80 W/K or less, more preferably 75 W/K or less, and even more preferably 70 W/K or less.

The apparent heat transfer coefficient h is obtained by the following equation (1).

$$h=(Nu/d)\times\lambda \quad (1)$$

wherein Nu is a fixed value of 3.63, d is the hydraulic diameter (m) of the cells, λ is the thermal conductivity of air (W/(m·K)), and assuming $\lambda=2.5\times10^{-2}$.

The total surface area S is calculated by the following equation (2):

$$S=GSA\times V \quad (2)$$

wherein V represents the volume (m$^3$) of the pillar-shaped honeycomb structure portion, GSA represents the surface area per volume of the pillar-shaped honeycomb structure portion (m$^2$/m$^3$), and GSA is calculated by the following equation (3):

$$GSA=\{4(P-t)\times Li\}/\{Li\times P^2\} \quad (3)$$

wherein Li represents a unit length (1 m), P represents the average cell pitch (m), and t represents the average thickness (m) of the partition walls.

The hydraulic diameter d (m) of the cell is a value (d=P−t) obtained by subtracting the average thickness t (m) of the partition walls from the average cell pitch P (m).

The volume of the pillar-shaped honeycomb structure portion refers to a volume value measured based on the outer dimensions of the pillar-shaped honeycomb structure portion.

The average cell pitch (P) refers to a value obtained by the following calculation. First, the end face area of the pillar-shaped honeycomb structure portion excluding the outer peripheral side wall is divided by the number of cells to calculate the area per cell. Next, the square root of the area per cell is calculated and used as the average cell pitch.

The average thickness of the partition walls is as described above.

(1-6. Bonding of Heater Elements)

Figure 5:
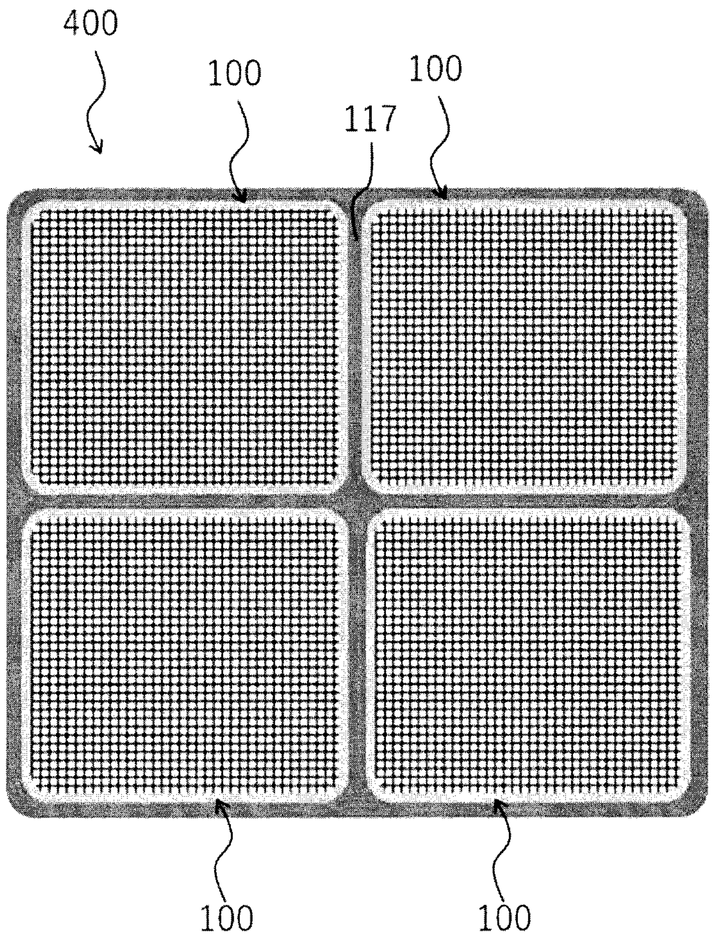
FIG. 5 is a schematic end face view showing an example of one embodiment in which a plurality of heater elements is bonded.

In one embodiment, the heater element according to the present invention can be provided as a heater element in which two or more heater elements are bonded together at their outer peripheral side walls. By bonding a plurality of small heater elements to form a large heater element, it is possible to increase the total cross-sectional area of cells, which is important for ensuring the gas flow rate while suppressing the generation of cracks. FIG. 5 shows a schematic end face view of an example of such a heater element. FIG. 5 shows a schematic end face view of a large heater element 400 having a substantially square end face which has been formed by bonding four heater elements 100 of the same size having a pillar-shaped honeycomb structure portion with a substantially square end face to each other in the vertical and horizontal directions (two by two) via the bonding material 117 between their outer peripheral side walls. The bonding material for bonding the outer peripheral side walls of the heater elements is not limited, but a paste material obtained by adding a solvent such as water to a ceramic material can be used. The bonding material may contain ceramics having PTC characteristics, and may contain the same ceramics as the outer peripheral side wall 112 and the partition walls 113. In addition to the role of bonding the heater elements to each other, the bonding material can also be used as a peripheral coat material for the entire large heater element after bonding a plurality of heater elements.

(1-7. Electrode)

In one embodiment, the heater element according to the present invention may have a pair of electrodes 118 (see FIG. 1). As the electrode 118, for example, an electrode containing at least one selected from Cu, Ag, Al and Si can be used. It is also possible to use an ohmic electrode which is capable of making ohmic contact with the outer peripheral side wall and/or the partition walls having PTC characteristics. As the ohmic electrode, for example, ohmic electrodes containing at least one selected from Au, Ag and In as a base metal and at least one selected from Ni, Si, Ge, Sn, Se and Te for n-type semiconductors as a dopant can be used.

The electrode 118 is preferably bonded to the outer peripheral side wall and/or the partition walls, and is preferably bonded to both the outer peripheral side wall and the partition walls, in order to efficiently flow the electric current in the pillar-shaped honeycomb structure portion. Therefore, for example, it is preferable to bond electrodes to the opposite side surfaces of the heater element, and it is more preferable to bond electrodes to both end faces of the heater element. When electrodes are formed on both end faces, it is preferable that each electrode is provided so as to cover each end face without blocking the cells, and more preferably be provided so as to cover the entire end face without blocking the cells. In other words, in preferred embodiments of the heater element according to the present invention, surface electrode layers (electrodes) 118 are formed on both the end faces of the outer peripheral side wall and the partition walls without blocking the cells. An electric wire 119 can be connected to the surface electrode layer 118 by diffusion bonding, mechanical pressure mechanism, welding or the like, and power can be supplied from a battery via the electric wire 119.

Figure 6:
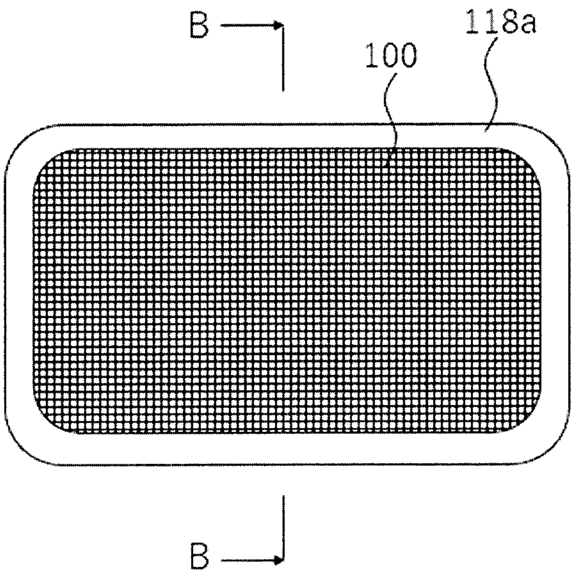
FIG. 6 is a schematic end face view regarding an embodiment in which a plurality of heater elements is bonded.
Figure 7:
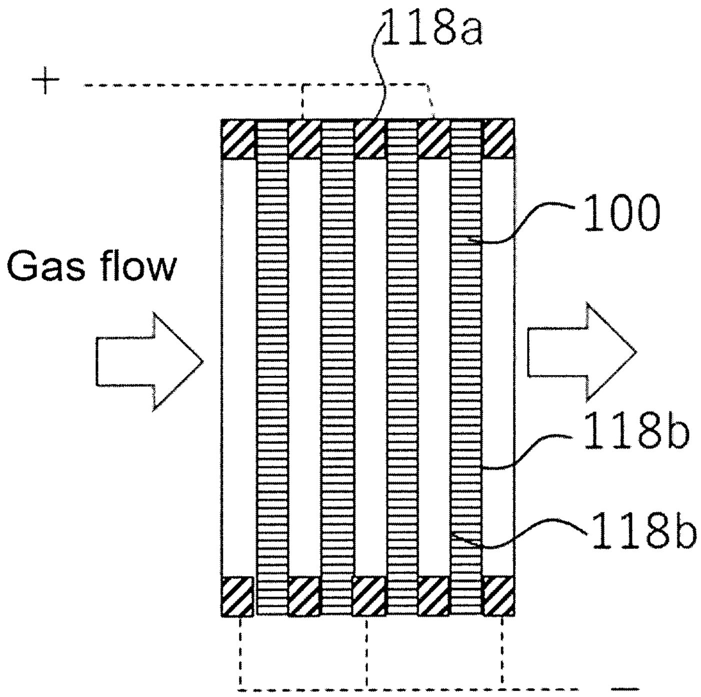
FIG. 7 is a schematic cross-section view taken along the line B-B of FIG. 6.

In one embodiment, the heater element according to the present invention can be provided as a heater element laminate in which a plurality of heater elements is laminated in the height direction (the flow path length of each cell) via electrodes. FIG. 6 shows a schematic end face view of such an embodiment. Further, FIG. 7 shows a schematic cross-sectional view taken along the line B-B of FIG. 6.

In the embodiment shown in FIG. 6, a plurality (specifically, four) of heater elements 100 are stacked in the height direction with ring-shaped electrodes 118*a* interposed therebetween. Each ring-shaped electrode 118*a* is bonded to the outer peripheral portion of each end face of each heater element 100. In the ring-shaped electrode 118*a*, positive electrodes and negative electrodes are alternately arranged in the height direction, and a plurality of heater elements 100 is electrically connected in parallel. Surface electrode layers 118*b* may also be formed on both end faces of each heater element 100 so as to cover both end faces without blocking the cells.

When performing gas heating, the gas temperature is low at the inlet, and becomes higher as it is heated downstream, and the temperature of the heater element itself becomes higher on the outlet side than on the inlet side. Similarly, a heater element formed integrally has a low temperature on the inlet side and a high temperature on the outlet side. In the integrally formed heater element, when the temperature in the vicinity of the outlet of the heater element becomes locally high, the electric resistance of that portion increases, and the current to other parts that are electrically arranged in series is also limited so that heat generation stops. As a result, the gas cannot be heated effectively as a whole. On the other hand, in the embodiment shown in FIG. 6 in which a plurality of heater elements 100 are electrically connected in parallel, there is no such problem, and currents flow independently. As a result, even if the current of one heater element is limited, the current continues to flow through the other heater elements, so that heat can be efficiently generated as a whole.

Further, when the total height of the heater element laminate is the same as the height of the integrally formed heater element, the electric resistance with respect to each heater element can be lower in the heater element laminate, so that there is an advantage that a large output can be obtained at a low voltage. For example, in the case of the heater element laminate, sufficient output can be secured by only applying a voltage of 12 to 48 V (for example, 12 V) to each heater element by increasing the number of laminated layers. The height of each heater element of the heater element laminate can be, for example, 1.5 mm to 3.0 mm. Further, according to the heater element laminate, a high output can be obtained in a smaller space as compared with the integrally formed heater element, and a contact area with passing air can be secured as well.

(1-8. Method for Using the Heater Element)

The heater element according to the present invention can generate heat by, for example, bonding a pair of electrodes to the heater element and then applying a voltage between the pair of electrodes. As the applied voltage, from the viewpoint of rapid heating, it is preferable to apply a voltage of 200 V or higher, and more preferably 250 V or higher. As described above, the heater element according to the present invention can suppress the initial current even when a high voltage is applied, and therefore has high safety. Moreover, since the safety specifications do not become heavy, the devices around the heater can be manufactured at a low cost.

When the heater element is generating heat by applying a voltage, the gas can be heated by flowing gas through the cell. The temperature of the gas flowing into the cell can be, for example, −60° C. to 20° C., and can be typically −10° C. to 20° C.

(1-9. Method for Manufacturing Heater Element)

Next, a method for manufacturing the heater element according to the present invention will be exemplarily described. First, a ceramic raw material is mixed with a raw material composition containing a dispersion medium and a binder and kneaded to prepare a green body, and then the green body is extruded to form a honeycomb formed body. If necessary, additives such as a dispersant, a semiconducting agent, a shifter, a metal oxide, a property improver, and a conductor powder can be added to the raw material composition. In extrusion molding, a die having a desired overall shape, cell shape, partition wall thickness, cell density and the like can be used.

The ceramic raw material is a raw material of a portion which remains after firing and constitutes the skeleton of the honeycomb structure as ceramics. The ceramic raw material can be provided in the form of powder, for example. As the ceramic raw material, an oxide and a carbonate raw material such as $TiO_2$ and $BaCO_3$ which become the main component of barium titanate can be used. Further, a semiconducting agent such as Y, La, Ce, Pr, Nd, Sm, Eu, Gd, Tb, Dy, Ho, Er, Tm, Yb and Lu, a low temperature side shifter such as Sr, Sn and Zr, a high temperature side shifter such as (Bi—Na), (Bi—K), a property improver such as Mn, and yet oxides, carbonates, or oxalates that become oxides after firing may be used. In order to control the conductivity, conductor powders such as carbon black and nickel may be added.

Examples of the dispersion medium include water, a mixed solvent of water and an organic solvent such as alcohol, and the like, and water can be particularly preferably used.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose and hydroxypropoxyl cellulose together. Further, the content of the binder is preferably 4 parts by mass or more, more preferably 5 parts by mass or more, and even more preferably 6 parts by mass with respect to 100 parts by mass of the ceramic raw material, from the viewpoint of increasing the strength of the honeycomb formed body. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of cracking due to abnormal heat generation in the firing step. One kind of binder may be used alone, or two or more kinds may be used in combination.

As the dispersant, a surfactant such as ethylene glycol, dextrin, fatty acid soap, and polyalcohol can be used. One kind of dispersant may be used alone, or two or more kinds may be used in combination. The content of the dispersant is preferably 0 to 2 parts by mass with respect to 100 parts by mass of the ceramic raw material.

Next, the obtained honeycomb formed body is dried. In the drying step, conventionally known drying methods such as hot wind drying, microwave drying, dielectric drying, reduced pressure drying, vacuum drying and freeze drying can be used. Among them, a drying method that combines hot wind drying with microwave drying or dielectric drying is preferable because the entire formed body can be dried quickly and uniformly.

Then, the dried honeycomb formed body can be fired to manufacture a heater element having a pillar-shaped honeycomb structure. It is also possible to perform a degreasing step for removing the binder before firing. The firing conditions can be appropriately determined depending on the material of the honeycomb formed body. For example, when the material of the honeycomb formed body contains barium titanate as a main component, the firing temperature is preferably 1100 to 1400° C., and more preferably 1200 to 1300° C. The firing time is preferably about 1 to 4 hours.

The atmosphere for carrying out the degreasing step may be, for example, an air atmosphere, an inert atmosphere, or a reduced pressure atmosphere. Among these, it is preferable to use an inert atmosphere in combination with a reduced pressure atmosphere that prevent insufficient firing due to the oxidation of the raw material and easily reduce the oxide contained in the raw material.

The furnace for firing is not particularly limited, but an electric furnace, a gas furnace or the like can be used.

A pair of electrodes can be bonded to the heater element having the pillar-shaped honeycomb structure portion obtained in this manner. The electrodes can be formed on the surface of the heater element, typically on the side surface or the end face, by metal deposition methods such as sputtering, vapor deposition, electrolytic deposition, and chemical deposition. Further, the electrodes can also be formed by applying an electrode paste on the surface of the heater element, typically on the side surface or the end face, and then by baking. Further, it can be formed by thermal spraying. By either method, an electrode coated on the surface of the heater element can be formed. The electrode may be composed of a single layer, but it may be composed of a plurality of electrode layers having different compositions. When the electrode is formed on the end face by the above method, the cell can be prevented from being blocked by setting the thickness of the electrode layer so as not to be excessively large. For example, the thickness of the electrode is preferably about 5 to 30 μm for baking a paste, about 100 to 1000 nm for dry plating such as sputtering and vapor deposition, about 10 to 100 μm for thermal spraying, and about 5 to 30 μm for wet plating such as electrolytic deposition and chemical deposition.

(2. Heater for Vehicle Compartment Heating)

Figure 8:
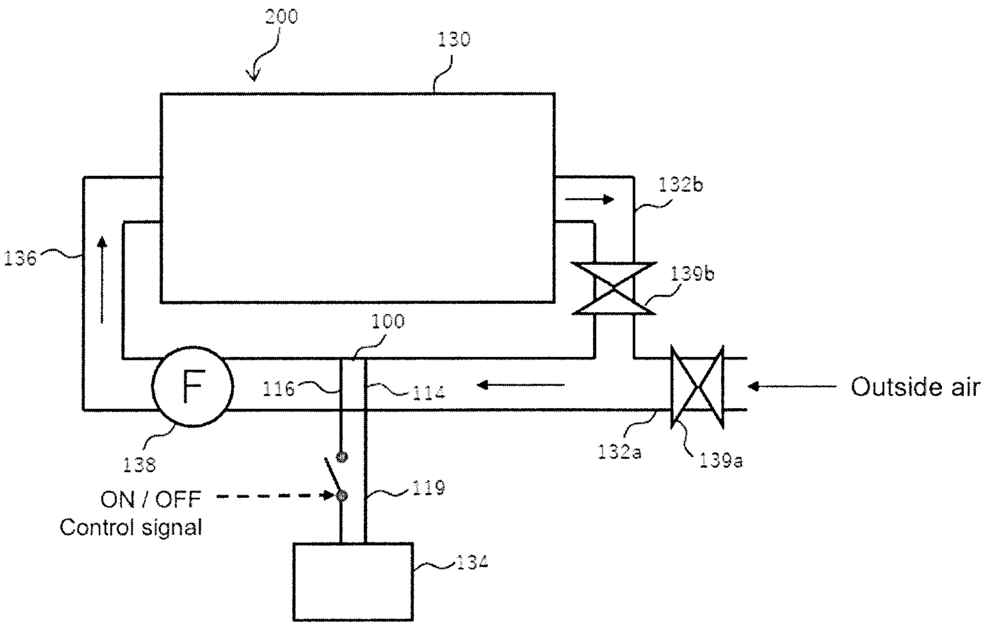
FIG. 8 is a schematic view showing a configuration example of the heater for vehicle compartment heating according to the present invention.

FIG. 8 schematically shows the configuration of the heater 200 for vehicle compartment heating according to one embodiment of the present invention. The heater according to this embodiment comprises a heater element 100 according to the present invention, an inflow piping 132 (132*a*, 132*b*) communicating the outside air or the air inside the vehicle compartment 130 with the first end face 114 of the heater element 100, a battery 134 for applying voltage to the heater element 100; and an outflow piping 136 communicating the second end face 116 of the heater element 100 with the air inside the vehicle compartment 130.

The heater element 100 can be configured, for example, to be in connect with the battery 134 with the electric wire 119, and to generate heat by energization by turning on a power switch in the middle.

A blower 138 may be installed on the upstream side or the downstream side of the heater element 100. From the viewpoint of ensuring safety by arranging high-voltage components as far away from the vehicle compartment as possible, it is preferable to install the blower on the downstream side of the heater element 100. When the blower 138 is driven, air flows into the heater element 100 from inside or outside the vehicle compartment through the inflow piping 132 (132*a*, 132*b*). The air is heated while passing through the heater element 100 which is generating heat. The heated air flows out of the heater element 100 and is sent into the vehicle compartment through the outflow piping 136. The outflow piping outlet may be arranged near the foot of the occupant so that the heating effect is particularly high in the vehicle compartment, or may be arranged in the seat to warm the seat from the inside, or may be arranged in the vicinity of the window so that it may also have the effect which suppresses the fog of the window.

The heater 200 for vehicle compartment heating according to the embodiment of FIG. 8 comprises an inflow piping 132*a* that communicates the outside air with the first end face 114 of the heater element 100. Further, the heater for vehicle compartment heating according to the embodiment of FIG. 8 comprises an inflow piping 132*b* that communicates the air inside the vehicle compartment 130 with the first end face 114 of the heater element 100. The inflow piping 132*a* and the inflow piping 132*b* join together on the way. Valves 139 (139*a*, 139*b*) may be installed in the inflow piping 132*a* and 132*b* on the upstream side of the joint point. By controlling the opening/closing of the valves 139 (139*a*, 139*b*), it is possible to switch between a mode in which the outside air is introduced into the heater element 100 and a mode in which the air inside the vehicle compartment 130 is introduced into the heater element 100. For example, when the valve 139*a* is opened and the valve 139*b* is closed, it becomes a mode in which the outside air is introduced into the heater element 100. It is also possible to open both the valve 139*a* and the valve 139*b* to introduce the outside air and the air inside the vehicle compartment 130 into the heater element 100 at the same time.

Figure 17:
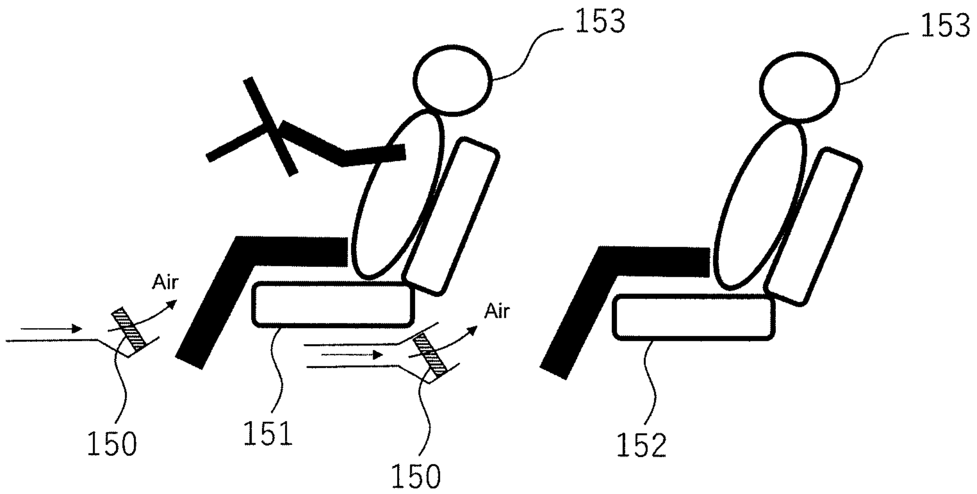
FIG. 17 is a schematic view showing an arrangement example of the heater element according to the present invention in a vehicle compartment.
Figure 18:
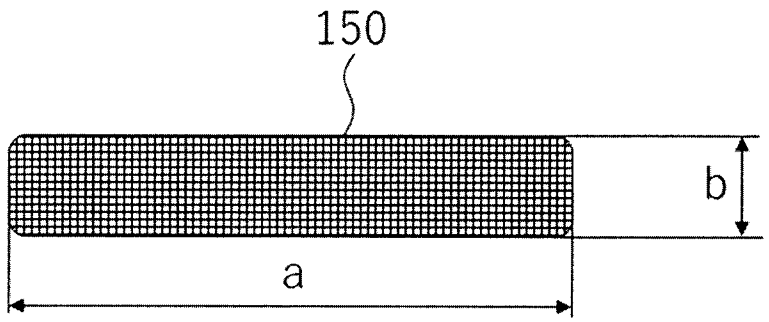
FIG. 18 is a schematic view showing an example of the end face shape of a pillar-shaped honeycomb structure portion of a heater element mounted in a vehicle compartment.

FIG. 17 is a schematic view showing an arrangement example of the heater element 150 according to the present invention in the vehicle compartment. The heater element 150 is installed at the feet of occupant 153 of each of the front seat 151 and the rear seat 152. The air warmed by passing through the heater element 150 is blown toward the occupant 153. Since the heater element 150 has high rapid warming capability, the occupant 153 can be warmed even if the entire vehicle compartment is yes not warmed. Further, FIG. 18 shows an example of the end face shape of the pillar-shaped honeycomb structure portion of the heater element 150 when it is assumed that the heater element 150 is installed at the feet of the occupant 153. In the heater element 150, the end face has a rectangular shape with four chamfered corners, and for example, can be set to a=50 to 300 mm and b=10 to 50 mm. The height (the flow path length of each cell) of the pillar-shaped honeycomb structure portion of the heater element 150 can be set to 2 to 10 mm, for example. When it is assumed that the heater element 150 is installed at the feet of the occupant, the voltage applied to the heater element 150 may be 12 to 48V, for example.

By forming the honeycomb heater with PTC materials, the degree of freedom in the cross-sectional shape is increased as compared with the case of using aluminum fins which is a conventional technique. When aluminum fins are used, air heating is performed through heat conduction from the heating element to the aluminum fins, so it is difficult to uniformly heat the entire heater cross-section for asymmetrical or irregular heater cross-sectional shapes. However, by forming the honeycomb from the PTC material itself, it is easy to ensure the temperature uniformity within the heater cross-section. The cross-section may be L-shaped, trapezoidal, elliptical, racetrack-shaped, or the like. Further, by forming the honeycomb heater from PTC material, the entire heater can be made compact. Therefore, it is easy to place it at the outlet of the tip of a small duct, and by placing the heater at the outlet, the entire heating power energy can be used to raise the temperature of the outlet air, except for a slight heat loss around the heating portion, without heat loss in the duct. As a result, the occupant can be efficiently warmed.

In one embodiment, the heater element according to the present invention may be mounted in a HVAC (heating, ventilating and air-conditioning unit). The HVAC is an air conditioning unit having an air warming and cooling function, and is being installed in hybrid vehicles and electric vehicles. Air blown from an air blowing machine such as a fan or a blower mounted on the HVAC passes through a heat exchanger that absorbs or dissipates the refrigerant, and is supplied into the vehicle. In some HVACs, an auxiliary heater (heating device), which is an electric heater, is provided in the air flow passage so that the auxiliary heater can exert heating capacity in addition to the heating by the heat exchanger of the refrigerant circuit. In addition, in some HVACs, heating by the heat exchanger of the refrigerant circuit is not performed (for example, the refrigerant circuit is only for cooling), and heating is performed only by a heater (heating device) powered by a battery. The heater element according to the invention can also be used in such an HVAC (auxiliary) heater.

In one embodiment, the heater element according to the present invention can reduce the pressure loss and lower the output of the blower, so that there is an advantage that the air blowing machine in the HVAC can be made smaller. Further, there is an advantage that the air heating rate is increased, and the rapid heating can be achieved. Furthermore, since the height (the flow path length of each cell) of the pillar-shaped honeycomb structure portion of the heater element can be shortened, this also contributes to downsizing of the HVAC system. When mounted in a HVAC, examples of typical dimensions of the pillar-shaped honeycomb structure portion of the heater element include a rectangular pillar-shaped quadrangle pillar having a rectangular end face of 200 mm×300 mm and a height of 15 mm. In this case, the voltage applied to the heater element may be, for example, 12V to 500V.

In one embodiment, the heater according to the present invention can be used as an auxiliary heater of a vehicle that employs a vapor compression heat pump as a main heating device, in which case it is also assumed that the air is not blown directly to the vehicle compartment as described above. In that case, the installation may be made such that the above-described “vehicle compartment” is replaced with “a part of the air flow piping of the main heating device”. In addition, the inflow piping 132*b* from the vehicle compartment may be further branched to provide a path for exhausting the air to the outside of the vehicle through a valve, but the exhaust to the outside of the vehicle may be performed by the main heating device using a vapor compression heat pump. Alternatively, the exhaust to the outside of the vehicle may be performed in conjunction with another exhaust system.

EXAMPLES

Hereinafter, the results of calculation by simulation of various characteristics of the heater element according to Examples and Comparative Examples of the present invention will be shown.

<Study 1>

(1. Specifications of Heater Element)

Heater elements having the specifications shown in Table 1-1 and Table 1-2 were set as a condition for simulation. In the tables, the honeycomb initial resistance (R) was calculated by the following formula with the room temperature volume resistivity (ρ) of barium titanate constituting the pillar-shaped honeycomb structure portion, the height (L) of the honeycomb structure portion, the end face area (A), and the open frontal area (OFA):

$$R=\rho\times L/(A\times(1-\text{OFA}))$$

TABLE 1-1

| | Example 1 | Comparative Example 1 | Comparative Example 2 | Comparative Example 3 |
|---|---|---|---|---|
| Honeycomb structure portion external shape | Cylindrical | Cylindrical | Cylindrical | Cylindrical |
| Diameter D (m) | 0.08 | 0.08 | 0.08 | 0.08 |
| Height L (m) | 0.03 | 0.03 | 0.03 | 0.03 |
| End face area ($cm^2$) | 50.24 | 50.24 | 50.24 | 50.24 |
| Honeycomb volume ($m^3$) | 1.51E−04 | 1.51E−04 | 1.51E−04 | 1.51E−04 |
| Honeycomb material | Barium titanate | Barium titanate | Barium titanate | Barium titanate |
| Room temperature volume resistivity of honeycomb material (Ωcm) (Assuming use of conductor powder) | 10 | 10 | 10 | 10 |
| Curie temperature of honeycomb material (° C.) (Assuming use of shifters) | 190 | 190 | 190 | 190 |
| Honeycomb initial resistance R (Ω) | 3.89 | 1.06 | 1.60 | 2.03 |
| Cell density (cpsi) | 400 | 200 | 300 | 400 |
| Cell density ($cell/cm^2$) | 62.0 | 31.0 | 46.5 | 62.0 |
| (Average) Partition wall thickness (mil) | 4 | 24 | 12 | 8 |
| (Average) Partition wall thickness (mm) | 0.1016 | 0.6096 | 0.3048 | 0.2032 |
| Outer peripheral side wall thickness (mm) | 1 | 1 | 1 | 1 |
| (Average) Cell pitch (mm) | 1.27 | 1.80 | 1.47 | 1.27 |
| Open frontal area (OFA) | 0.85 | 0.44 | 0.63 | 0.71 |
| Cell hydraulic diameter (m) | 0.0011684 | 0.001186451 | 0.00116167 | 0.0010668 |
| Heat transfer coefficient to gas (h × S) (W/K) | 3.39E+01 | 1.70E+01 | 2.54E+01 | 3.39E+01 |
| Electrode position | Both end faces | Both end faces | Both end faces | Both end faces |
| Electrode material | Cu coat | Cu coat | Cu coat | Cu coat |
| Honeycomb material density ($kg/m^3$) | 4500 | 4500 | 4500 | 4500 |
| Honeycomb structure portion mass (kg) | 0.10 | 0.38 | 0.25 | 0.20 |
| Specific heat (J/kg/K) | 590 | 590 | 590 | 590 |
| Honeycomb structure portion total heat capacity (J/K) | 61.46 | 225.54 | 149.06 | 117.81 |

TABLE 1-2

| | Example 2 | Example 3 | Example 4 | Example 5 |
|---|---|---|---|---|
| Honeycomb structure portion external shape | Cylindrical | Cylindrical | Cylindrical | Segment with square cross section × 4 |
| Diameter D (m) | 0.08 | 0.08 | 0.08 | (Length of one side) 0.12 |
| Height L (m) | 0.03 | 0.03 | 0.03 | 0.015 |
| End face area ($cm^2$) | 50.24 | 50.24 | 50.24 | 144 |
| Honeycomb material | Barium titanate | Barium titanate | Barium titanate | Barium titanate |
| Room temperature volume resistivity of honeycomb material (Ωcm) (Assuming use of conductor powder) | 10 | 10 | 10 | 60 |
| Curie temperature of honeycomb material (° C.) (Assuming use of shifters) | 190 | 190 | 190 | 190 |
| Honeycomb initial resistance R (Ω) | 5.13 | 3.20 | 4.22 | 3.39 |
| Cell density (cpsi) | 400 | 600 | 600 | 400 |
| Cell density ($cell/cm^2$) | 62.0 | 93.0 | 93.0 | 62.0 |
| (Average) Partition wall thickness (mil) | 3 | 4 | 3 | 4 |
| (Average) Partition wall thickness (mm) | 0.0762 | 0.1016 | 0.0762 | 0.1016 |
| Outer peripheral side wall thickness (mm) | 1 | 1 | 1 | 1 |
| (Average) Cell pitch (mm) | 1.27 | 1.04 | 1.04 | 1.27 |
| Open frontal area (OFA) | 0.88 | 0.81 | 0.86 | 0.85 |
| Cell hydraulic diameter (m) | 0.0011938 | 0.000935351 | 0.000960751 | 0.0011684 |
| Heat transfer coefficient to gas (h × S) (W/K) | 3.39E+01 | 5.09E+01 | 5.09E+01 | 4.86E+01 |
| Electrode position | Inlet and outlet end faces | Inlet and outlet end faces | Inlet and outlet end faces | Inlet and outlet end faces |
| Electrode material | Cu coat | Cu coat | Cu coat | Cu coat |
| Honeycomb material density ($kg/m^3$) | 4500 | 4500 | 4500 | 4500 |

TABLE 1-2-continued

| | Example 2 | Example 3 | Example 4 | Example 5 |
|---|---|---|---|---|
| Honeycomb structure portion mass (kg) | 0.08 | 0.13 | 0.10 | 0.15 |
| Specific heat (J/kg/K) | 590 | 590 | 590 | 590 |
| Honeycomb structure portion total heat capacity (J/K) | 46.68 | 74.57 | 56.65 | 88.09 |

(2. Initial Current Value and Initial Output)

An initial current value and an initial output when a voltage of 100 V, 200 V and 300 V is applied to each of the above heater elements at room temperature were calculated.

The initial current value was calculated by the following equation: Initial current value=Applied voltage/Honeycomb initial resistance The initial output was calculated by the following equation: Initial output=Initial current value×Applied voltage The calculation results are shown in Table 2-1 and Table 2-2.

TABLE 2-1

| | Example 1 | Comparative Example 1 | Comparative Example 2 | Comparative Example 3 |
|---|---|---|---|---|
| Initial current value I (A) @100 V | 2.57E+01 | 9.44E+01 | 6.24E+01 | 4.93E+01 |
| Initial output Q (kW) @100 V | 2.57E+00 | 9.44E+00 | 6.24E+00 | 4.93E+00 |
| Initial current value I (A) @200 V | 5.14E+01 | 1.89E+02 | 1.25E+02 | 9.86E+01 |
| Initial output Q (kW) @200 V | 1.03E+01 | 3.78E+01 | 2.50E+01 | 1.97E+01 |
| Initial current value I (A) @300 V | 7.72E+01 | 2.83E+02 | 1.87E+02 | 1.48E+02 |
| Initial output Q (kW) @300 V | 2.32E+01 | 8.49E+01 | 5.61E+01 | 4.44E+01 |

TABLE 2-2

| | Example 2 | Example 3 | Example 4 | Example 5 |
|---|---|---|---|---|
| Initial current value I (A) @100 V | 1.95E+01 | 3.12E+01 | 2.37E+01 | 2.46E+01 |
| Initial output Q (kW) @100 V | 1.95E+00 | 3.12E+00 | 2.37E+00 | 2.46E+00 |
| Initial current value I (A) @200 V | 3.90E+01 | 6.24E+01 | 4.74E+01 | 5.90E+01 |
| Initial output Q (kW) @200 V | 7.80E+00 | 1.25E+01 | 9.48E+00 | 1.18E+01 |
| Initial current value I (A) @300 V | 5.85E+01 | 9.36E+01 | 7.11E+01 | 7.37E+01 |
| Initial output Q (kW) @300 V | 1.75E+01 | 2.81E+01 | 2.13E+01 | 2.21E+01 |

From Table 2-1 and Table 2-2, it is understood that Examples 1 to 5 have smaller initial current values and initial outputs than Comparative Examples 1 to 3. This is because the heater elements of Examples 1 to 5 appropriately adapted materials, a partition wall thickness (same as the average partition wall thickness), and an appropriate open frontal area, resulting in the increased the initial resistance.

(3. Pressure Loss when Passing Gas)

The relative values of the pressure loss when a gas was caused to flow through each of the above heater elements under the conditions of room temperature air and a flow rate of 4 $Nm^3$/min were calculated by the following equation:

Relative value of pressure loss=Pressure loss of each Example or Comparative Example/(Pressure loss of a 4 mil 400 cpsi honeycomb having same the honeycomb shape)

The pressure loss in each of Examples and Comparative Examples is described based on the data actually measured on the honeycomb bodies made of different materials but having the same structure. Since the pressure loss changes dependent primarily on the honeycomb structure, it is hardly affected by the difference of materials. The calculation results are shown in Tables 3-1 and 3-2.

TABLE 3-1

| | Example 1 | Comparative Example 1 | Comparative Example 2 | Comparative Example 3 |
|---|---|---|---|---|
| Relative value of pressure loss between end faces | 1.00 | 1.88 | 1.36 | 1.44 |

TABLE 3-2

| | Example 2 | Example 3 | Example 4 | Example 5 |
|---|---|---|---|---|
| Relative value of pressure loss between end faces | 0.92 | 1.62 | 1.46 | 0.17 |

According to Tables 3-1 and 3-2, it is possible to reduce the pressure loss by appropriately setting the open frontal area, the cell density, and the like. In particular, it can be seen that the reduction of pressure loss is small in Examples 1, 2 and 5, and that among them, Example 5 is highly effective in suppressing pressure loss.

(4. Heating Performance)

The change over time of the temperature of the heater element and the temperature of the air flowing out from the heater element was calculated when a voltage of 200 V was applied to the heater elements of Example 1 and Comparative Example 3 while air at 5° C. (constant pressure specific heat Cp=1 kJ/(kg·K)) was flowed at a mass flow rate of 0.08 kg/sec (=4 $Nm^3$/min).

The change over time of the temperature of the heater element and the change over time of the temperature of the air flowing out from the heater element were calculated as follows. The volume resistivity a of the honeycomb heater material is known as a function of temperature.

Once the honeycomb dimensions and cell structure are determined, the electrical resistance R of the honeycomb structure can be calculated as a function of temperature.

The calorific value $dQ_H$ in a minute time dt from the honeycomb when a voltage V is applied is $V^2/R \times dt$.

On the other hand, the heat transfer amount $dQ_c$ from the honeycomb to the gas is represented by the difference of the honeycomb temperature $T_H$ and the inlet gas temperature $T_g$, and the heat transfer index S×h between the gas and the entire honeycomb:

$$dQ_c=(T_H-T_g)\times S\times h\times dt$$

Assuming the honeycomb heat capacity is $C_H$, the honeycomb temperature $T_H'$ after a minute time dt is represented as $$T_H'=T_H+(dQ_H-dQ_c)/C_H$$

The outlet gas temperature is sequentially calculated by the gas flow rate, the passage time, the specific heat of the gas and the integrated value of $dQ_c$ during the time.

By repeating this calculation every minute time, it is possible to calculate the change over time in the honeycomb temperature (=heater element temperature) and the outlet gas temperature (=air temperature flowing out from the heater element).

Figure 9:
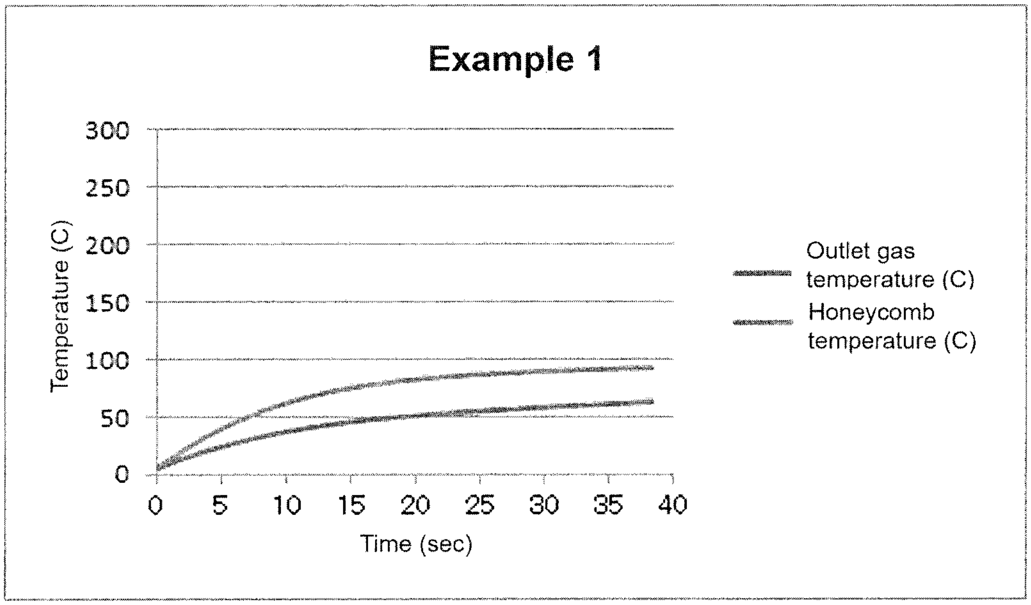
FIG. 9 is a graph showing changes over time of the temperature of the heater element and the temperature of the air flowing out from the heater element regarding the heater element according to Example 1.
Figure 10:
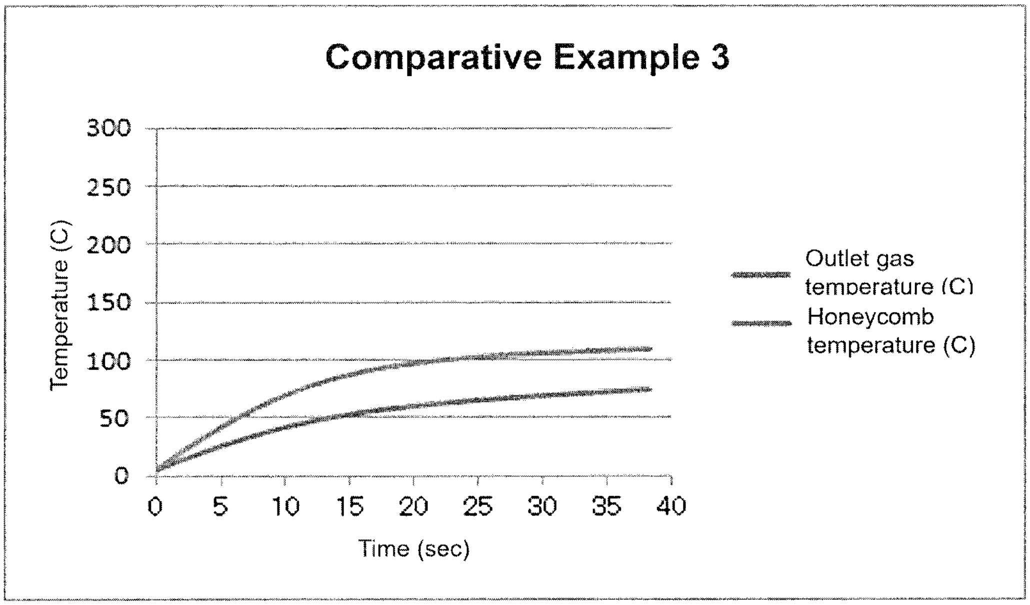
FIG. 10 is a graph showing changes over time of the temperature of the heater element and the temperature of the air flowing out from the heater element regarding the heater element according to Comparative Example 3.

The results are shown in FIGS. 9 and 10. From these, it can be seen that the heater element of the Example has a heating performance comparable to that of the heater element of the Comparative Example.

<Study 2>

(1. Heater Element Model and Analysis Conditions)

Figure 11:
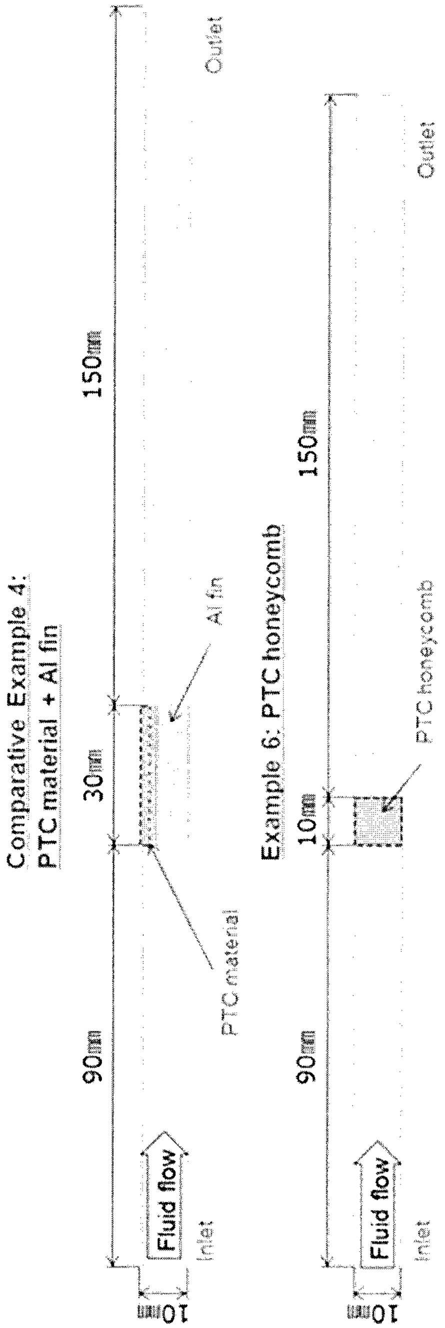
FIG. 11 (A) is a side view of the heater element models used in Comparative Example 4 and Example 6 as viewed from a direction orthogonal to the fluid flow.
Figure 11:
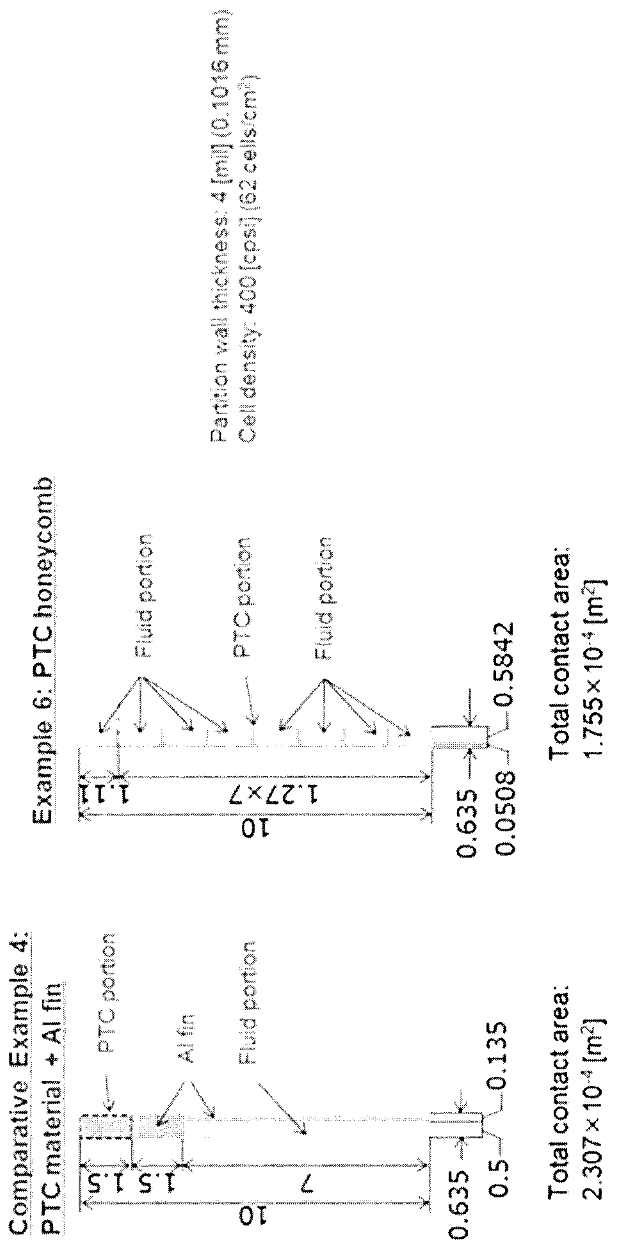

The heater element models of Comparative Example 4 and Example 6 shown in a side view of FIG. 11 (A) and a heat generating portion cross-sectional view of FIG. 11 (B) were used for simulation. The heater element of Comparative Example 4 has a structure in which plate fins made of aluminum are bonded to a plate PTC material. The heater element of Example 6 has a honeycomb structure in which cells are arranged in one direction. FIG. 11 (A) and FIG. (B) show models of repeating units of the heater elements, and the cross-sectional area of the heater element was assumed to be 100 mm×300 mm by repeating them.

For the simulation, commercially available thermal fluid analysis software was used, and unsteady calculation was performed from the state where the initial temperature of the gas and the heater element was set to 0° C., and changes of temperature, pressure loss, and electric power in time series were determined. The analysis conditions of simulation were as follows.

Solver type: Pressure-based solver

Turbulence model: SST k-ω

Physical Properties

<Fluid>

Air (incompressible ideal gas)

<PTC Material>

Density: 4500 [kg/m$^3$]

Specific heat: 590 [J/(kg·K)]

Thermal conductivity: 2 [W/(m·K)]

<Aluminum>

Density: 2700 [kg/m$^3$]

Specific heat: 870 [J/(kg·K)]

Thermal conductivity: 220 [W/(m·K)]

Boundary Conditions

Peripheral surface: Thermal insulated state

Solid wall surface: No-slip

Outlet: Open to atmosphere

Inlet (temperature): 0 [° C.] constant

Inlet (flow rate): $2.463165\times10^{-5}$ [kg/s] (0.01905 [NL/s])

Heat Generating Conditions

Figure 12:
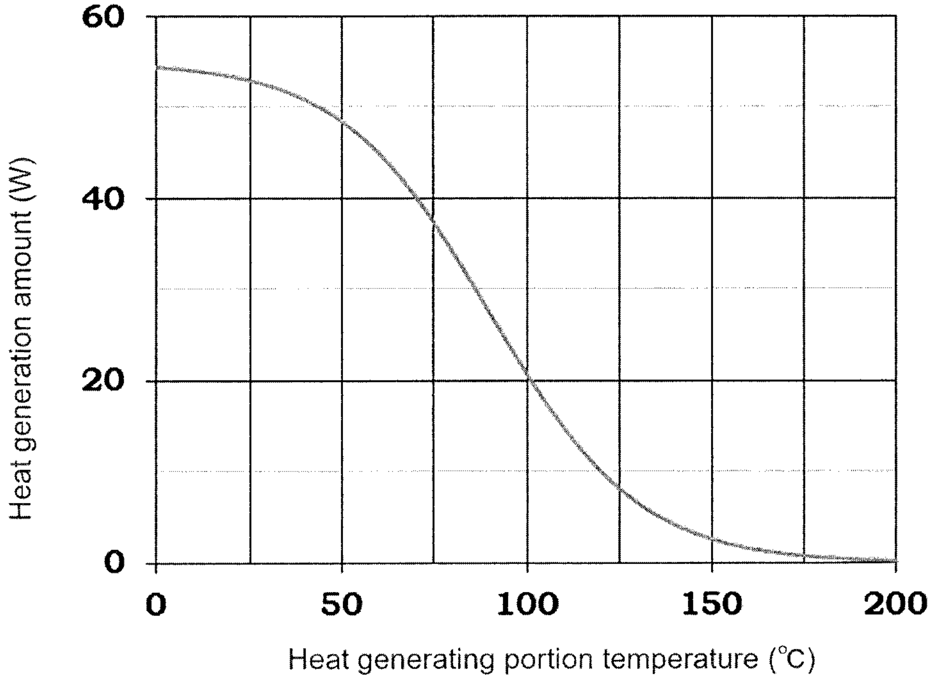
FIG. 12 is a graph showing the temperature dependence of the heat generation amount of the PTC material used in the simulation.

According to the relationship between the heater element temperature and the heat generation amount shown in FIG. 12, the time series heat generation amount during unsteady calculation was set to be variable according to the temperature of the heat generating portion.

(2. Heating Performance)

Figure 13:
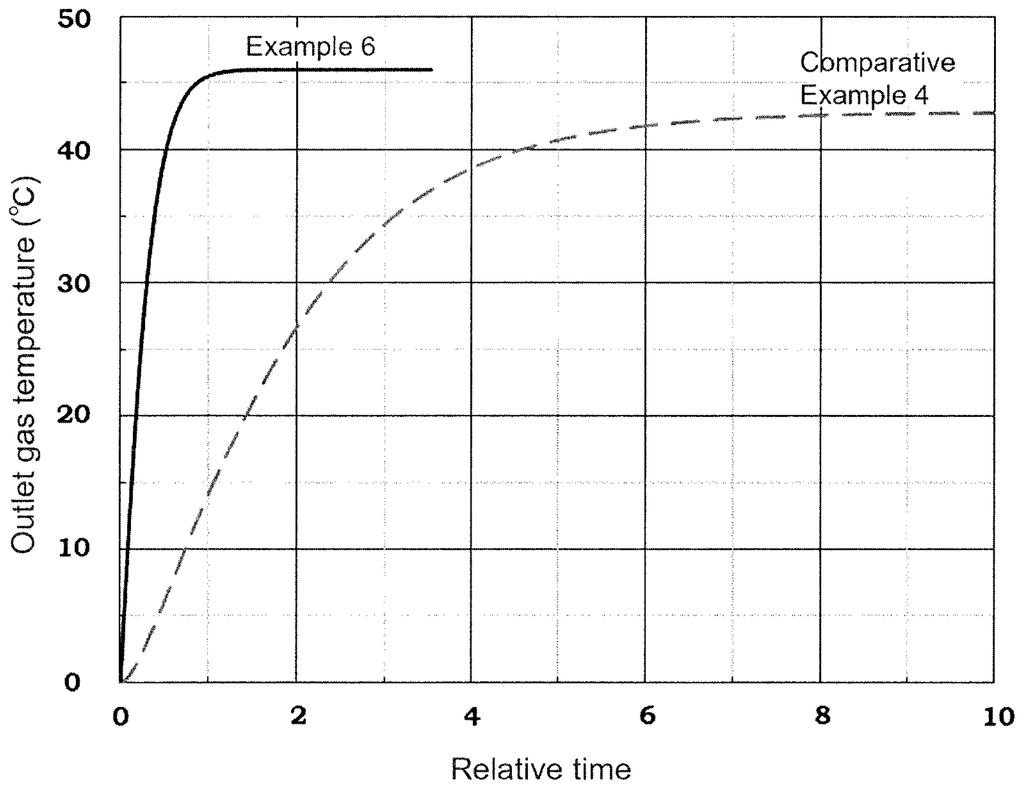
FIG. 13 (A) is a graph showing changes over time of the average outlet temperature of fluid for the heater elements according to Comparative Example 4 and Example 6.
Figure 13:
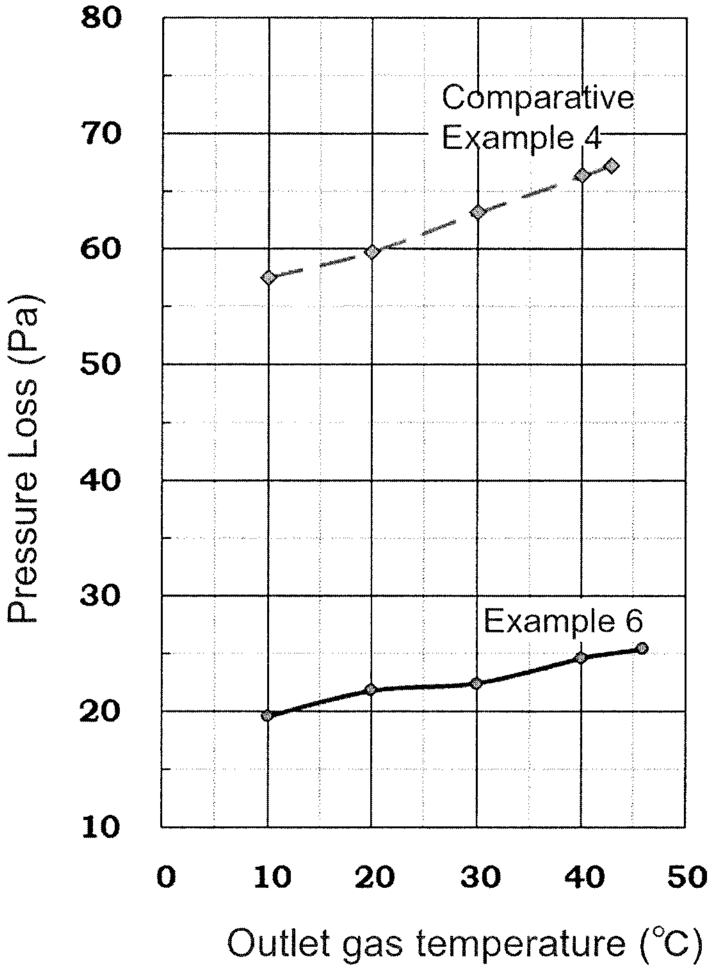

The change over time of the average outlet temperature of the fluid when the heater elements were heated under the above heat generating conditions while flowing fluid through the heater elements of Comparative Example 4 and Example 6 at a flow rate of 5.4 Nm$^3$/min from the inlet to the outlet was calculated. The results are shown in FIG. 13 (A). It can be seen that the time required to reach the thermal equilibrium state of about 40 to 45° C. was shortened in Example 6 to less than ⅕ of that in Comparative Example 4.

(3. Pressure Loss During Fluid Passage)

The relationship between the average outlet temperature of the fluid and the pressure loss from the inlet to the outlet was calculated under the same conditions as in the above heating performance test. The results are shown in FIG. 13 (B). It can be seen that the pressure loss in Example 6 was about ⅓ that in Comparative Example 4.

<Study 3>

(1. Heater Element Model and Analysis Conditions)

Example 7: Same as the heater element model of Example 6.

Comparative Example 5: Same as the heater element model of Example 6 except that the partition wall thickness was 12 mil (0.3048 mm) and the cell density was 300 cpsi (46.5 cells/cm$^2$) (The number of cells and the flow rate of the fluid flowing per unit area are the same as in Example 6).

The analysis conditions of simulation were as follows.

Heat Generating Conditions

Figure 14:
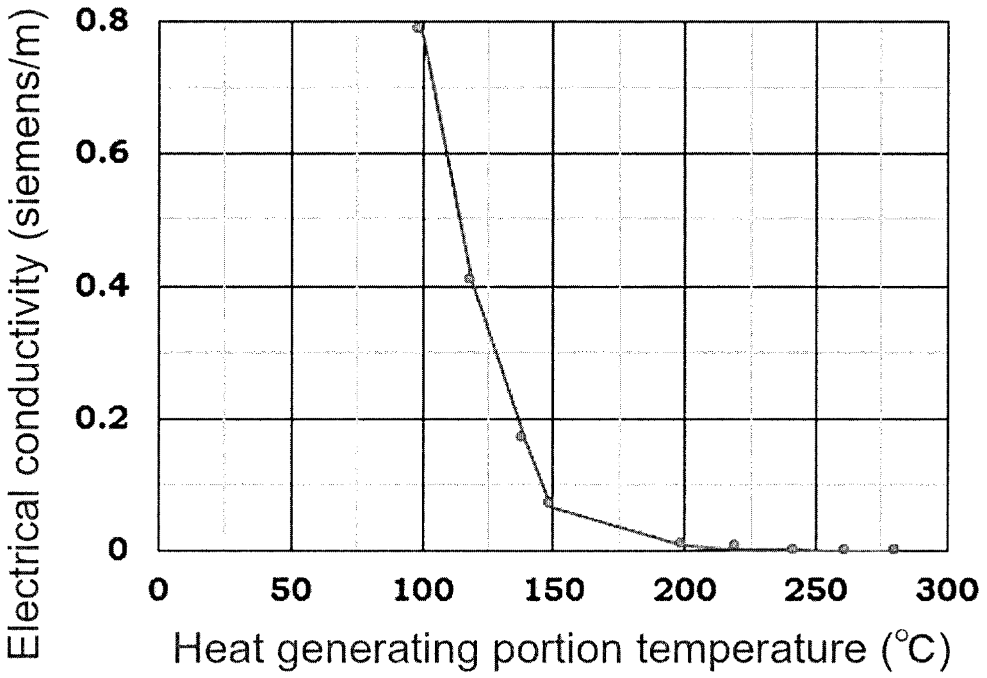
FIG. 14 is a graph showing the temperature dependence regarding the electrical conductivity of the PTC material used in the simulation.

By applying a constant voltage of 200 V to the heater element, a current flowed according to the relationship between the temperature of the heat generating portion and the electric conductivity shown in FIG. 14, and heat is generated by energization.

Other analysis conditions are in accordance with Test Example 2.

(2. Heating Performance)

Figure 15:
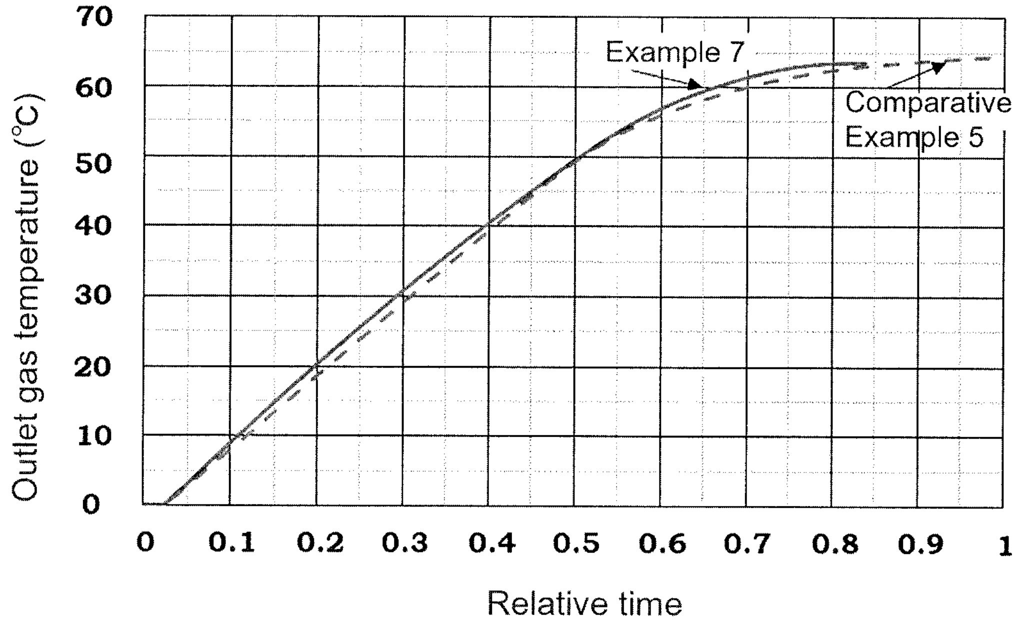
FIG. 15 (A) is a graph showing changes over time of the average outlet temperature of the fluid for the heater elements according to Example 7 and Comparative Example 5.
Figure 15:
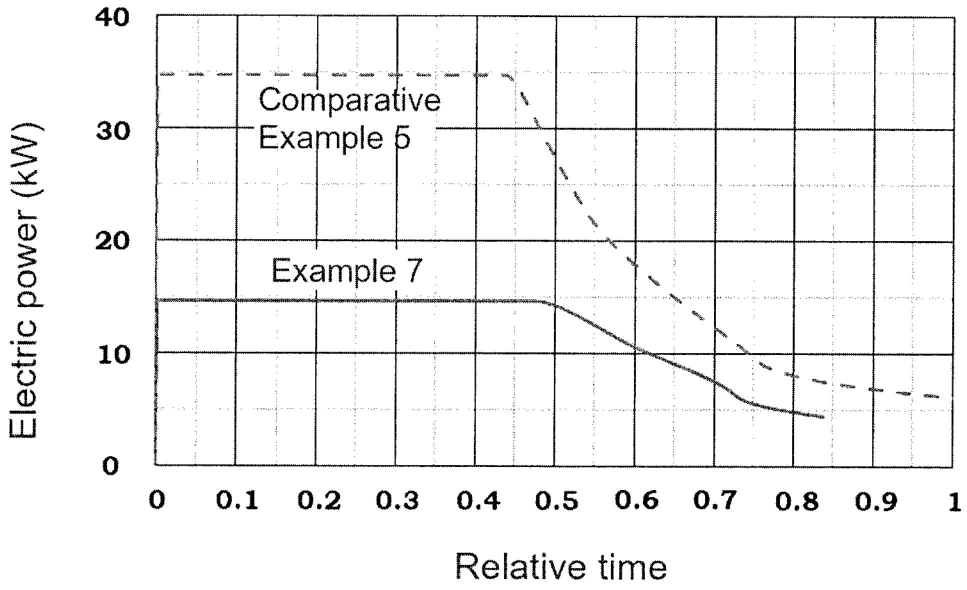

The change over time of the average outlet temperature of the fluid when the heater elements were heated under the above heat generating conditions while flowing fluid through the heater elements of Example 7 and Comparative Example 5 at a flow rate of 5.4 Nm$^3$/min from the inlet to the outlet was calculated. The results are shown in FIG. 15 (A). Moreover, the change over time of the output (electric power) was also calculated. The results are shown in FIG. 15 (B). It can be seen that the heating performance of Example 7 is high because Example 7 has a similar rate of temperature increase in comparison with Comparative Example 5 although the initial power is significantly lower.

(3. Temperature Distribution)

Figure 16:
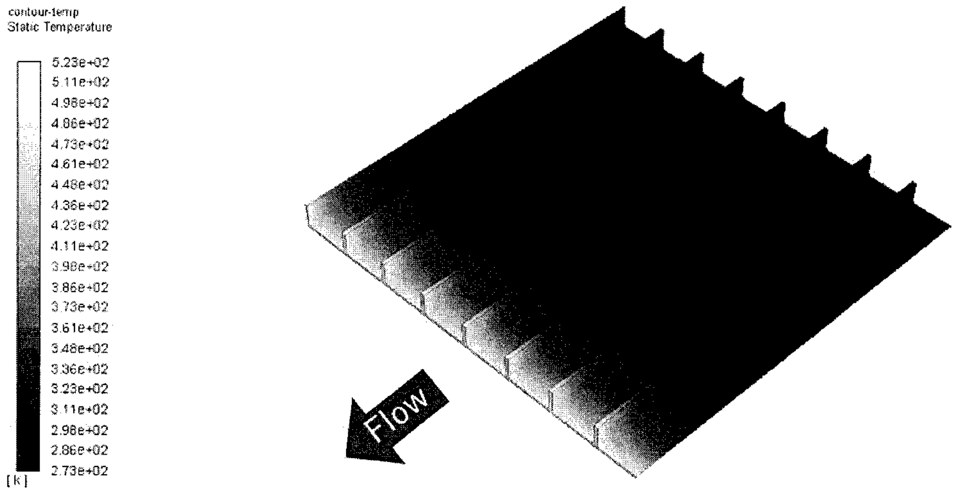
FIG. 16 (A) shows the temperature distribution of the partition walls from the inlet to the outlet regarding the heater element according to Example 7.
Figure 16:
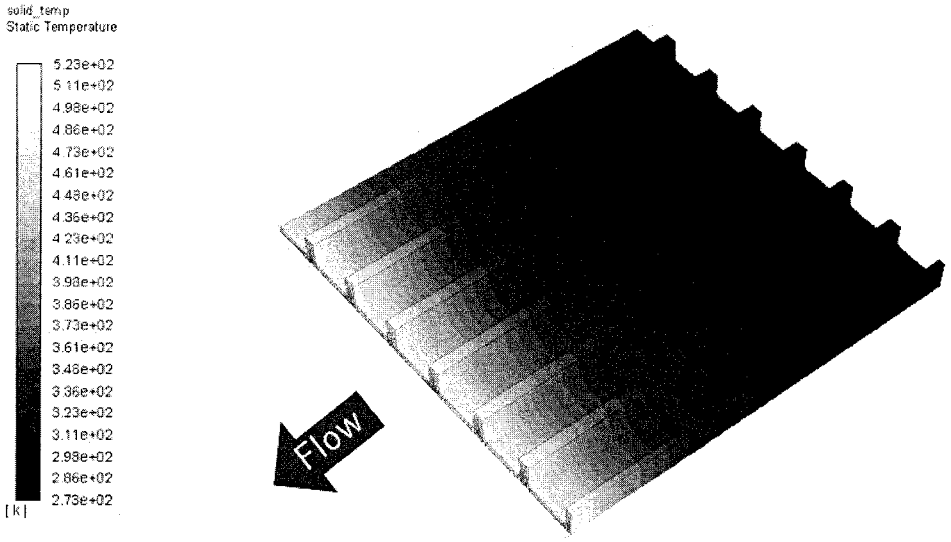

Under the same conditions as the above heating performance test, the temperature distribution of the partition walls (Example 7 and Comparative Example 5) from the inlet to the outlet of the cells of the heater elements when the thermal equilibrium state was achieved was determined by sequentially calculate the voltage, current, temperature, and electrical resistance of each partition wall element. The results are shown in FIG. 16 (A) and FIG. 16 (B). The low temperature region of Example 7 is larger than that of Comparative Example 5. This is because, when the hydraulic diameters of the cells are the same, the honeycomb heat capacity is lower in Example 7 whose partition wall thickness is thinner, and the in-solid thermal resistance along the partition wall is larger, so that the honeycomb temperature is lower in a wider region in the flow direction. Therefore, the amount of heat transfer to the fluid can be increased.

<Study 4>

(1. Method for Preparing Heater Element)

With respect to 100 parts by mass of pre-synthesized powder containing substantially no lead component and mainly composed of $BaTiO_3$ phase, a total of 6 parts by mass of a molding aid including an organic binder and a surfactant etc. as other raw materials and 10 parts by mass of water were added. These were kneaded using a kneader to produce a plastic green body. A pillar-shaped honeycomb formed body was prepared from the obtained green body using an extrusion molding machine. Here, the pillar-shaped honeycomb formed body has, for example, a partition wall thickness of 3 mil, a cell density of 400 cpsi (cell per square inches), an outer wall thickness of about 0.6 mm, and includes lattice-shaped partition walls that defines a plurality of cells that form fluid paths inside. The prepared pillar-shaped honeycomb formed body was dried with hot wind, degreased in the air, fired in an inert atmosphere, and then heat-treated in the air to prepare a heater element having a pillar-shaped honeycomb structure portion.

(2. Electrical Characteristics)

The temperature characteristics of electric resistance of the heater element obtained in 1. were evaluated, and the Curie point was 100° C.

(3. Heating Performance)

When a constant voltage of 200 V was applied to the heater element obtained in 1. while flowing air from the inlet to the outlet of the heater element at a flow rate of 2 m/sec, the outlet gas temperature reached 90° C. in 5 seconds, reaching a thermal equilibrium state.

DESCRIPTION OF REFERENCE NUMERALS

- 100 Heater element
- 112 Outer peripheral side wall
- 113 Partition wall
- 114 First end face
- 115 Cell
- 116 Second end face
- 117 Bonding material
- 118 Electrode
- 118*a* Ring-shaped electrode
- 118*b* Surface electrode layer
- 119 Electric wire
- 130 Vehicle compartment
- 139 (139*a*, 139*b*) Valve
- 132 (132*a*, 132*b*) Inflow piping
- 134 Battery
- 136 Outflow piping
- 138 Blower
- 150 Heater element
- 151 Front seat
- 152 Rear seats
- 153 Occupant
- 200 Heater for vehicle compartment heating
- 400 Bonded heater element

The invention claimed is:

1. A heater element for vehicle compartment heating in a vehicle, comprising a pillar-shaped honeycomb structure portion having:

an outer peripheral side wall; and partition walls disposed inside the outer peripheral side wall, the partition walls defining a plurality of cells which form flow paths from a first end face to a second end face;

wherein the outer peripheral side wall and the partition walls are made of a material comprising barium titanate as a main component;

the outer peripheral side wall and the partition walls have PTC characteristics;

an average thickness of the partition walls is 0.13 mm or less; and an open frontal area on the first and second end faces is 0.81 or more.

2. The heater element for vehicle compartment heating according to claim 1, wherein the average thickness of the partition walls is 0.08 mm or less, and a cell density is 60 cells/$cm^2$ or more.

3. The heater element for vehicle compartment heating according to claim 1, wherein in the pillar-shaped honeycomb structure portion, the first and second end faces each has an area of 50 $cm^2$ or more, and a flow path length of the cells is 40 mm or less.

4. The heater element for vehicle compartment heating according to claim 1, wherein the pillar-shaped honeycomb structure portion has a cylindrical shape or a polygonal pillar shape.

5. The heater element for vehicle compartment heating according to claim 1, wherein the outer peripheral side wall and the partition walls are made of a material having a Curie point of 100° C. or more and 250° C. or less.

6. The heater element for vehicle compartment heating according to claim 1, wherein an apparent heat transfer coefficient h (unit: $W/(m^2 \cdot K)$)×a total surface area (unit: $m^2$) S is 20 to 80 W/K, wherein the apparent heat transfer coefficient h is calculated by the following equation (1):

$$h=(Nu/d)\times\lambda \qquad (1)$$

wherein Nu is a fixed value of 3.63, d is a hydraulic diameter (m) of the cells, λ is a thermal conductivity of air (W/(m·K)), and assuming $\lambda=2.5\times10^{-2}$; the total surface area S is calculated by the following equation (2):

$$S=GSA\times V \qquad (2)$$

wherein V represents a volume (m3) of the pillar-shaped honeycomb structure portion, GSA represents a surface area per volume of the pillar-shaped honeycomb structure portion ($m^2/m^3$), and GSA is calculated by the following equation (3):

$$GSA=\{4(P-t)\times Li\}/\{Li\times P^2\} \qquad (3)$$

wherein Li represents a unit length (1 m),

P represents an average cell pitch (m), and t represents the average thickness (m) of the partition walls.

7. The heater element for vehicle compartment heating according to claim 1, wherein the pillar-shaped honeycomb structure portion comprises a pair of electrodes.

8. The heater element for vehicle compartment heating according to claim 7, wherein the electrodes are respectively bonded to both of the first and second end faces of the pillar-shaped honeycomb structure portion.

9. The heater element for vehicle compartment heating according to claim 8, wherein each of the electrodes is provided so as to cover each of the first and second end faces without blocking the cells.

10. A heater element for vehicle compartment heating, wherein two or more heater elements for vehicle compartment heating according to claim 1 are bonded together at their outer peripheral side walls.

11. A method for using the heater element for vehicle compartment heating according to claim 7, wherein a voltage of 200 V or more is applied between the electrodes.

12. The method for using a heater element for vehicle compartment heating according to claim 11, wherein a temperature of a gas flowing into the cells is −60° C. to 20° C.

13. A heater apparatus for vehicle compartment heating, comprising:

the heater element for vehicle compartment heating according to claim 1, an inflow piping communicating an outside air or an air inside the vehicle compartment with the first end face of the heater element for vehicle compartment heating, a battery for applying voltage to the heater element for vehicle compartment heating; and an outflow piping communicating the second end face of the heater element for vehicle compartment heating with the air inside the vehicle compartment.

* * * * *